(12) United States Patent
Jen et al.

(10) Patent No.: US 9,023,248 B2
(45) Date of Patent: *May 5, 2015

(54) DIELS-ALDER CROSSLINKABLE DENDRITIC NONLINEAR OPTIC CHROMOPHORES AND POLYMER COMPOSITES

(75) Inventors: Kwan-Yue Jen, Kenmore, WA (US); Zhengwei Shi, Seattle, WA (US); Jingdong Luo, Shoreline, WA (US); Su Huang, Seattle, WA (US); Xinghua Zhou, Ann Arbor, MI (US)

(73) Assignee: University of Washington, Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/463,231

(22) Filed: May 3, 2012

(65) Prior Publication Data
US 2012/0252995 A1 Oct. 4, 2012

Related U.S. Application Data

(63) Continuation of application No. 12/474,174, filed on May 28, 2009, now Pat. No. 8,173,045.

(60) Provisional application No. 61/056,761, filed on May 28, 2008.

(51) Int. Cl.
| H01B 1/00 | (2006.01) |
| H01B 1/12 | (2006.01) |
| B05D 5/12 | (2006.01) |
| G02F 1/361 | (2006.01) |
| C08F 222/10 | (2006.01) |
| C08F 228/06 | (2006.01) |
| C08G 83/00 | (2006.01) |

(52) U.S. Cl.
CPC ........ *G02F 1/3614* (2013.01); *C08F 222/1006* (2013.01); *C08F 228/06* (2013.01); *C08G 83/002* (2013.01)

(58) Field of Classification Search
CPC .................................................. G02F 1/3614
USPC ............................................ 252/500; 427/58
See application file for complete search history.

(56) References Cited

U.S. PATENT DOCUMENTS

| | | |
|---|---|---|
| 5,272,218 A | 12/1993 | Cheng |
| 5,276,745 A | 1/1994 | Revelli, Jr. |
| 5,286,872 A | 2/1994 | Okazaki |
| 5,288,816 A | 2/1994 | Inbasekaran |
| 5,290,485 A | 3/1994 | Gotoh |
| 5,290,630 A | 3/1994 | Devonald |
| 5,290,824 A | 3/1994 | Mandal |
| 5,291,574 A | 3/1994 | Levenson |
| 5,298,588 A | 3/1994 | Gibbons |
| 5,310,918 A | 5/1994 | Uchino |
| 5,312,565 A | 5/1994 | Beckerbauer |
| 5,322,986 A | 6/1994 | Nutt |
| 5,326,661 A | 7/1994 | Sansone |
| 5,334,333 A | 8/1994 | Goetz |
| 5,338,481 A | 8/1994 | Wu |
| 5,352,566 A | 10/1994 | Springer |
| 5,354,511 A | 10/1994 | Wu |
| 5,359,072 A | 10/1994 | Mignani |
| 5,360,582 A | 11/1994 | Boyd |
| 5,371,173 A | 12/1994 | Marks |
| 5,371,817 A | 12/1994 | Revelli, Jr. |
| 5,374,734 A | 12/1994 | Zyss |
| 5,381,507 A | 1/1995 | Robello |
| 5,383,050 A | 1/1995 | Yamamoto |
| 5,384,378 A | 1/1995 | Etzbach |
| 5,384,883 A | 1/1995 | Rikken |
| 5,387,629 A | 2/1995 | McGrath |
| 5,395,556 A | 3/1995 | Drost |
| 5,397,508 A | 3/1995 | Masse |
| 5,397,642 A | 3/1995 | Li |
| 5,399,664 A | 3/1995 | Peng |
| 5,403,936 A | 4/1995 | Kawamonzen |
| 5,405,926 A | 4/1995 | Brittain |
| 5,406,406 A | 4/1995 | Yamamoto et al. |
| 5,408,009 A | 4/1995 | Okazaki |
| 5,410,630 A | 4/1995 | Robello |
| 5,414,791 A | 5/1995 | Ermer |
| 5,418,871 A | 5/1995 | Revelli, Jr. |
| 5,420,172 A | 5/1995 | Nordmann |
| 5,434,699 A | 7/1995 | Berkovic |
| 5,442,089 A | 8/1995 | Mitra |
| 5,443,758 A | 8/1995 | Kaji |
| 5,443,895 A | 8/1995 | Peiffer |
| 5,445,854 A | 8/1995 | Newsham |
| 5,447,662 A | 9/1995 | Herr |

(Continued)

OTHER PUBLICATIONS

Baehr-Jones, T.W., and M.J. Hochberg, "Polymer Silicon Hybrid Systems: A Platform for Practical Nonlinear Optics," Journal of Physical Chemistry C 112(21):8085-8090, 2008.

Chen, X., et al., "A Thermally Re-Mendable Cross-Linked Polymeric Material," Science 295(5560):1698-1702, Mar. 2002.

Goussé, C., et al., "Application of the Diels-Alder Reaction to Polymers Bearing Furan Moieties. 2. Diels-Alder and Retro-Diels-Alder Reactions Involving Furan Rings in Some Styrene Copolymers," Macromolecules 31(2):314-321, Jan. 1998.

(Continued)

*Primary Examiner* — Peter F Godenschwager

(74) *Attorney, Agent, or Firm* — Christensen O'Connor Johnson Kindness PLLC

(57) ABSTRACT

Diels-Alder crosslinkable dendritic nonlinear optical chromophore compounds, films and crosslinked polymer composites formed from the chromophore compounds, methods for making and using the chromophore compounds, films, and crosslinked polymer composites, and electro-optic devices that include films and crosslinked polymer composites formed from the chromophore compounds.

26 Claims, 16 Drawing Sheets

(56) References Cited

U.S. PATENT DOCUMENTS

| | | |
|---|---|---|
| 5,460,907 A | 10/1995 | Ducharme |
| 5,465,310 A | 11/1995 | Kersten |
| 5,466,397 A | 11/1995 | Bales |
| 5,467,421 A | 11/1995 | Kaji |
| 5,483,005 A | 1/1996 | Etzbach |
| 5,484,550 A | 1/1996 | Warner |
| 5,484,821 A | 1/1996 | Mandal |
| 5,489,451 A | 2/1996 | Omeis |
| 5,500,156 A | 3/1996 | Marder |
| 5,501,821 A | 3/1996 | Williand |
| 5,507,974 A | 4/1996 | Gompper |
| 5,514,799 A | 5/1996 | Varanasi |
| 5,514,807 A | 5/1996 | Pecaut |
| 5,517,350 A | 5/1996 | Cabrera |
| 5,520,968 A | 5/1996 | Wynne |
| 5,521,277 A | 5/1996 | Tan |
| 5,526,450 A | 6/1996 | Kester |
| 5,532,320 A | 7/1996 | Tripathy |
| 5,534,201 A | 7/1996 | Summers |
| 5,534,613 A | 7/1996 | Tan |
| 5,535,048 A | 7/1996 | Mignani |
| 5,536,866 A | 7/1996 | Tan |
| 5,547,705 A | 8/1996 | Fukuzawa |
| 5,547,763 A | 8/1996 | Scozzafava |
| 5,557,699 A | 9/1996 | Kester |
| 5,561,733 A | 10/1996 | Ermer |
| 5,578,251 A | 11/1996 | Boyd |
| 5,588,083 A | 12/1996 | Boonstra |
| 5,594,075 A | 1/1997 | Reinhardt |
| 5,604,038 A | 2/1997 | Denes |
| 5,604,292 A | 2/1997 | Stenger-Smith |
| 5,605,726 A | 2/1997 | Gibbons |
| 5,612,387 A | 3/1997 | Ogawa |
| 5,622,654 A | 4/1997 | Summers |
| 5,633,337 A | 5/1997 | Tan |
| 5,637,717 A | 6/1997 | Pecaut |
| 5,649,045 A | 7/1997 | Fjare |
| 5,663,308 A | 9/1997 | Gibbons |
| 5,670,090 A | 9/1997 | Marder |
| 5,670,091 A | 9/1997 | Marder |
| 5,670,603 A | 9/1997 | Wu |
| 5,676,884 A | 10/1997 | Tiers |
| 5,679,763 A | 10/1997 | Jen |
| 5,688,906 A | 11/1997 | Jen |
| 5,693,744 A | 12/1997 | Choi |
| 5,707,544 A | 1/1998 | Kelly |
| 5,708,178 A | 1/1998 | Ermer |
| 5,714,304 A | 2/1998 | Gibbons |
| 5,718,845 A | 2/1998 | Drost |
| 5,726,317 A | 3/1998 | Nishikata |
| 5,729,641 A | 3/1998 | Chandonnet |
| 5,736,592 A | 4/1998 | DeMeuse |
| 5,738,806 A | 4/1998 | Beckmann |
| 5,741,442 A | 4/1998 | McBranch |
| 5,745,613 A | 4/1998 | Fukuchi |
| 5,746,949 A | 5/1998 | Shen |
| 5,759,447 A | 6/1998 | Efron |
| 5,764,820 A | 6/1998 | De Dobbelaere |
| 5,770,121 A | 6/1998 | Wang |
| 5,776,374 A | 7/1998 | Newsham |
| 5,776,375 A | 7/1998 | Hofstraat |
| 5,777,089 A | 7/1998 | Beckmann |
| 5,783,306 A | 7/1998 | Therien |
| 5,783,649 A | 7/1998 | Beckmann et al. |
| 5,800,733 A | 9/1998 | Kelly |
| 5,804,101 A | 9/1998 | Marder |
| 5,807,974 A | 9/1998 | Kim |
| 5,811,507 A | 9/1998 | Chan |
| 5,830,988 A | 11/1998 | Chan |
| 5,831,259 A | 11/1998 | Charra |
| 5,834,100 A | 11/1998 | Marks |
| 5,834,575 A | 11/1998 | Honda |
| 5,837,783 A | 11/1998 | Arnold |
| 5,844,052 A | 12/1998 | Keller |
| 5,847,032 A | 12/1998 | Arnold |
| 5,851,424 A | 12/1998 | Kelly |
| 5,851,427 A | 12/1998 | Kelly |
| 5,856,384 A | 1/1999 | Garito |
| 5,861,976 A | 1/1999 | Hoekstra |
| 5,862,276 A | 1/1999 | Karras |
| 5,872,882 A | 2/1999 | Woudenberg |
| 5,881,083 A | 3/1999 | Diaz-Garcia |
| 5,882,785 A | 3/1999 | Hollins |
| 5,883,259 A | 3/1999 | Kim |
| 5,889,131 A | 3/1999 | Kim |
| 5,892,857 A | 4/1999 | McCallion |
| 5,901,259 A | 5/1999 | Ando |
| 5,903,330 A | 5/1999 | Funfschilling |
| 5,908,916 A | 6/1999 | Woudenberg |
| 5,911,018 A | 6/1999 | Bischel |
| 5,930,017 A | 7/1999 | Davis |
| 5,930,412 A | 7/1999 | Toussaere |
| 5,935,491 A | 8/1999 | Tripathy |
| 5,937,115 A | 8/1999 | Domash |
| 5,937,341 A | 8/1999 | Suominen |
| 5,940,417 A | 8/1999 | Wu |
| 5,943,154 A | 8/1999 | Nakayama |
| 5,943,464 A | 8/1999 | Khodja |
| 5,948,322 A | 9/1999 | Baum |
| 5,948,915 A | 9/1999 | Nishikata |
| 5,949,943 A | 9/1999 | Watanabe |
| 5,953,469 A | 9/1999 | Zhou |
| 5,959,159 A | 9/1999 | Kazlauskas |
| 5,959,756 A | 9/1999 | Keyworth |
| 5,962,658 A | 10/1999 | Suh |
| 5,963,683 A | 10/1999 | Goorjian |
| 5,966,233 A | 10/1999 | Fujiwara |
| 5,970,185 A | 10/1999 | Baker |
| 5,970,186 A | 10/1999 | Kenney |
| 5,982,958 A | 11/1999 | Minowa |
| 5,982,961 A | 11/1999 | Pan |
| 5,985,084 A | 11/1999 | Summersgill |
| 5,987,202 A | 11/1999 | Gruenwald |
| 5,993,700 A | 11/1999 | Katz |
| 6,001,958 A | 12/1999 | Tapolsky |
| 6,005,058 A | 12/1999 | Sandman |
| 6,005,707 A | 12/1999 | Berggren |
| 6,013,748 A | 1/2000 | Matsuda |
| 6,017,470 A | 1/2000 | Katz |
| 6,020,457 A | 2/2000 | Klimash |
| 6,022,671 A | 2/2000 | Binkley |
| 6,025,453 A | 2/2000 | Keller |
| 6,026,205 A | 2/2000 | McCallion |
| 6,033,773 A | 3/2000 | Yang |
| 6,033,774 A | 3/2000 | Yitzchaik |
| 6,037,105 A | 3/2000 | You |
| 6,041,157 A | 3/2000 | Goetz |
| 6,045,888 A | 4/2000 | Chen |
| 6,047,095 A | 4/2000 | Knoesen |
| 6,048,928 A | 4/2000 | Yu |
| 6,049,641 A | 4/2000 | Deacon |
| 6,051,722 A | 4/2000 | Honda |
| 6,061,481 A | 5/2000 | Heidrich |
| 6,061,487 A | 5/2000 | Toyama |
| 6,067,186 A | 5/2000 | Dalton |
| 6,072,920 A | 6/2000 | Ando |
| 6,081,632 A | 6/2000 | Yoshimura |
| 6,081,634 A | 6/2000 | Attard |
| 6,081,794 A | 6/2000 | Saito |
| 6,086,794 A | 7/2000 | Nobutoki |
| 6,090,332 A | 7/2000 | Marder |
| 6,091,879 A | 7/2000 | Chan |
| 7,014,796 B2 | 3/2006 | Jen |
| 7,029,606 B2 | 4/2006 | Dalton |
| 7,078,542 B2 | 7/2006 | Jen |
| 7,144,960 B2 | 12/2006 | Jen |
| 7,268,188 B2 | 9/2007 | Jen |
| 7,307,173 B1 | 12/2007 | Jen |
| 7,346,259 B1 | 3/2008 | Jen |
| 7,425,643 B1 | 9/2008 | Jen |
| 7,507,840 B2 | 3/2009 | Dalton |
| 7,601,849 B1 | 10/2009 | Jen |
| 8,173,045 B2 * | 5/2012 | Jen et al. ........................ 252/500 |
| 2007/0112140 A1 * | 5/2007 | Jen et al. ........................ 525/276 |

(56) References Cited

U.S. PATENT DOCUMENTS

| | | |
|---|---|---|
| 2007/0152198 A1 | 7/2007 | Jen |
| 2007/0284556 A1 | 12/2007 | O'Neill |
| 2009/0118521 A1 | 5/2009 | Jen |
| 2009/0148717 A1 | 6/2009 | Jen |
| 2009/0149618 A1 | 6/2009 | Jen |

OTHER PUBLICATIONS

Kwart, H., and K. King, "The Reverse Diels-Alder or Retrodiene Reaction," Chemical Reviews 68(4):415-447, Aug. 1968.

Luo, J., et al., "Design, Synthesis, and Properties of Highly Efficient Side-Chain Dendronized Nonlinear Optical Polymers for Electro-Optics," Advanced Materials 14(23):1763-1768, Dec. 2002.

Ma, H., and A.K.-Y. Jen, "Functional Dendrimers for Nonlinear Optics," Advanced Materials 13(15):1201-1205, Aug. 2001.

Ma, H., et al., "Highly Efficient and Thermally Stable Nonlinear Optical Dendrimer for Electrooptics," Journal of the American Chemical Society 123(5):986-987, 2001.

Ma, H., et al., "Polymer-Based Optical Waveguides: Materials, Processing, and Devices," Advanced Materials 14(19):1339-1365, Oct. 2002.

McElhanon, J.R., and D.R. Wheeler, "Thermally Responsive Dendrons and Dendrimers Based on Reversible Furan-Maleimide Diels-Alder Adducts," Organic Letters 3(17):2681-2683, Aug. 2001.

Miller, R.D., et al., "Donor-Embedded Nonlinear Optical Side Chain Polyimides Containing No Flexible Tether: Materials of Exceptional Thermal Stability for Electrooptic Applications," Macromolecules 28(14):4970-4974, Jul. 1995.

Yoon, S.S., and W.C. Still, "Sequence-Selective Peptide Binding With a Synthetic Receptor," Tetrahedron 51(2):567-578, Jan. 1995.

Cai, C., et al., "Donor-Acceptor-Substituted Phenylethenyl Bithiophenes: Highly Efficient and Stable Nonlinear Optical Chromophores," Organic Letters 1(11):1847-1849, Nov. 1999.

Dalton, L., et al., "From Molecules to Opto-Chips: Organic Electro-Optic Materials," Journal of Materials Chemistry 9:1905-1920, 1999.

Dalton, L., et al., "Polymeric Electro-Optic Modulators: From Chromophore Design to Integration With Semiconductor Very Large Scale Integration Electronics and Silica Fiber Optics," Industrial & Engineering Chemistry Research 38(1):8-33, Dec. 1998.

Eldada, L., and L.W. Shacklette, "Advances in Polymer Integrated Optics," IEEE Journal of Selected Topics in Quantum Electronics 6(1):54-68, Jan./Feb. 2000.

Enami, Y., et al., "Hybrid Polymer/Sol-Gel Waveguide Modulators With Exceptionally Large Electro-Optic Coefficients," Nature Photonics 1:180-185, Mar. 2007.

Facchetti, A., et al., "Very Large Electro-Optic Responses in H-Bonded Heteroaromatic Films Grown by Physical Vapour Deposition," Nature Materials 3(12):910-917, Dec. 2004.

Gopalan, P., et al., "Star-Shaped Azo-Based Dipolar Chromophores: Design, Synthesis, Matrix Compatibility, and Electro-Optic Activity," Journal of the American Chemical Society 126(6):1741-1747, Jan. 2004.

Hochberg, M., et al., "Terahertz All-Optical Modulation in a Silicon-Polymer Hybrid System," Nature Materials 5(9):703-709, Sep. 2006.

Jen, A., et al., "High-Performance Polyquinolines With Pendent High-Temperature Chromophores for Second-Order Nonlinear Optics," Chemistry of Materials 10(2):471-473, Jan. 1998.

Jen, K.Y., et al., "Exceptional Electro-Optic Properties Through Molecular Design and Controlled Self-Assembly," Proceedings of SPIE (The International Society for Optical Engineering) 5935 (Linear and Nonlinear Optics of Organicmaterials V):49-61, 2005.

Jiang, H., and A.K. Kakkar, "Functionalized Siloxane-Linked Polymers for Second-Order Nonlinear Optics," Macromolecules 31(8):2501-2508, Mar. 1998.

Kang, H., et al., "Ultralarge Hyperpolarizability Twisted π-Electron System Electro-Optic Chromophores: Synthesis, Solid-State and Solution-Phase Structural Characteristics, Electronic Structures, Linear and Nonlinear Optical Properties, and Computational Studies," Journal of the American Chemical Society 129(11):3267-3286, Feb. 2007.

Kim, T.-D., et al., "Binary Chromophore Systems in Nonlinear Optical Dendrimers and Polymers for Large Electrooptic Activities," The Journal of Physical Chemistry 112(21):8091-8098, Apr. 2008.

Kim, T.-D., et al., "Ultralarge and Thermally Stable Electro-Optic Activities From Supramolecular Self-Assembled Molecular Glasses," Journal of the American Chemical Society 129(3):488-489, Jan. 2007.

Kuklja, M.M., "Thermal Decomposition of Solid Cyclotrimethylene Trinitramine," The Journal of Physical Chemistry B 105(42):10159-10162, Oct. 2001.

Lee, M., et al., "Broadband Modulation of Light by Using an Electro-Optic Polymer," Science 298(5597):1401-1403, Nov. 2002.

Liakatas, I., et al., "Importance of Intermolecular Interactions in the Nonlinear Optical Properties of Poled Polymers," Applied Physics Letters 76(11):1368-1370, Mar. 2000.

Luo, J., et al., "Highly Efficient and Thermally Stable Electro-Optic Polymer From a Smartly Controlled Crosslinking Process," Advanced Materials 15(19):1635-1638, Oct. 2003.

Ma, H., et al., "Highly Efficient and Thermally Stable Nonlinear Optical Dendrimer for Electrooptics," Journal of the Americal Chemical Society 123(5):986-987, Jan. 2001.

Marder, S.R., et al., "Large First Hyperpolarizabilities in Push-Pull Polyenes by Tuning of the Bond Length Alternation and Aromaticity," Science 263(5146):511-514, Jan. 1994.

Rao, V.P., et al., "Ketene Dithioacetal as a π-Electron Donor in Second-order Nonlinear Optical Chromophores," Journal of the Chemical Society, Chemical Communications 14:1689-1690, Jul. 1994.

Raźna, J., et al., "NLO Properties of Polymeric Langmuir-Blodgett Films of Sulfonamide-Substituted Azobenzenes," Journal of Materials Chemistry 9:1693-1698, 1999.

Shi, Y., et al., "Low (Sub-1-Volt) Halfwave Voltage Polymeric Electro-optic Modulators Achieved by Controlling Chromophore Shape," Science 288(5463):119-122, Apr. 2000.

Shi, Z., et al., "Controlled Diels-Alder Reactions Used to Incorporate Highly Efficient Polyenic Chromophores Into Maleimide-Containing Side-Chain Polymers for Electro-Optics," Macromolecules 42(7):2438-2445, Mar. 2009.

Shi, Z., et al., "Reinforced Site Isolation Leading to Remarkable Thermal Stability and High Electrooptic Activities in Cross-Linked Nonlinear Optical Dendrimers," Chemistry of Materials 20(20):6372-6377, Sep. 2008.

Teng, C.C., and H.T. Man, "Simple Reflection Technique for Measuring the Electrooptic Coefficient of Poled Polymers," Applied Physics Letters 56(18):1734-1736, Apr. 1990.

Todorova, G., "Design, Synthesis and Characterization of Novel Second-Order Nonlinear Optical Chromophores with Fused-Ring Polyenes for Application in Polymeric Electro-Optic Modulators," Ph.D. Dissertation, University of Southern California, Aug. 2000, 128 pages.

Van Den Broeck, K., et al., "Synthesis and Nonlinear Optical Properties of High Glass Transition Polyimides," Macromolecular Chemistry and Physics 200:2629-2635, Nov. 1999.

Wooten, E.L., et al., "A Review of Lithium Niobate Modulators for Fiber-Optic Communication Systems," IEEE Journal of Selected Topics in Quantum Electronics, 6(1):69-82, Jan./Feb. 2000.

Zhang, C., "Novel Phenylpolyene-Bridged Second-Order Nonlinear Optical Chromophores and New Thermally Stable Polyurethanes for Electro-Optic Applications," Ph.D. Dissertation, University of Southern California, May 1999, 210 pages.

\* cited by examiner

A

B

DIELS-ALDER CROSSLINKABLE DENDRITIC NONLINEAR OPTIC CHROMOPHORES AND POLYMER COMPOSITES

CROSS-REFERENCE TO RELATED APPLICATION

This application is a continuation of U.S. patent application Ser. No. 12/474,174, filed May 28, 2009, now U.S. Pat. No. 8,173,045, which claims the benefit of U.S. Provisional Patent Application No. 61/056,761, filed May 28, 2008, each expressly incorporated herein by reference in its entirety.

STATEMENT OF GOVERNMENT LICENSE RIGHTS

This invention was made with Government support under Contract No. DMR0120967 awarded by the National Science Foundation, and Contract No. N00014-06-0859 awarded by the Office of Naval Research. The Government has certain rights in the invention.

BACKGROUND OF THE INVENTION

Extensive research to produce oriented nonlinear optical (NLO) chromophores exhibiting large electro-optic (EO) activity and good thermal stability has been pursued for years. Recent studies showed that effective site isolation and molecular assembly are critical for improving the performance of such materials. In newly reported dendritic molecular glasses, chromophores with large hyperpolarizability (βμ) are selectively functionalized and self-assembled into well-defined architectures, leading to materials with high poling-induced acentric order and large EO coefficients ($r_{33}$ values of up to 100-300 pm/V at the wavelength of 1310 nm). These materials provides an effective platform to build innovative optical devices, such as low-$V_\pi$ Mach-Zender interferometers, EO ring resonators, and polymer-silicon slotted waveguide modulators. Although the progress is encouraging, it is believed that greater impact could be accomplished for high-speed information processing if the well-established semiconductor processes for microelectronics could be applied to photonics. High speed processing will provide a boost to the development of devices for urgently needed high bandwidth information processing. In order to fulfill this, materials need to meet numerous stringent requirements in manufacturing, assembly, and end-use environments of devices. Therefore, the search for organic E-O materials with sufficient $r_{33}$ values and excellent thermal stability is an ongoing challenge.

The poling induced polar order of large βμ chromophores in any organic spin-on materials must withstand prolonged operation temperatures of up to 100° C., and brief temperature excursions during processing that may exceed 250° C. To date, many studies have been performed on improving one or some of these required properties. However, none of the materials developed to date meet all of the above criteria. Furthermore, the thermal stability and decomposition mechanisms of new generation of highly polarizable chromophores are not well understood.

The intrinsic stability of typical high-$r_{33}$ E-O dendrimers and binary polymers under high temperature (up to 200° C.) has been investigated. These materials often contain high concentrations of chemically sensitive chromophores, which are spaced apart by either physical π-π interactions or "loosely" crosslinked polymeric networks containing flexible tether groups. Most of these materials have relatively low to moderate glass transition temperatures ($T_g$), and are only thermally stable enough (85-150° C.) to satisfy the basic fabrication and operation of conventional optical modulators.

However, rapid decomposition of chromophores is often observed for these materials under higher temperatures. From both thermal and spectroscopic analysis of a standardized dipolar chromophore, 2-[4-(2-{5-[2-(4-{bis-[2-(tert-butyl-dimethyl-silanyloxy)-ethyl]-amino}-phenyl)-vinyl]-thiophen-2-yl}-vinyl)-3-cyano-5-methyl-5-trifluoromethyl-5H-furan-2-ylidene]malononitrile (AJL8), it was found that a bimolecular reaction mechanism is responsible for the initial decomposition of the chromophore. The detailed mechanism for site-specific reactivity of NLO chromophores has not been well understood, and therefore optimization of organic E-O materials for high temperature applications has been impaired.

A need exists for E-O materials with acceptable $r_{33}$ values that also have thermal stability sufficient for manufacturing, assembly, and end-use environments of electro-optic devices. The present invention seeks to fulfill this need and provides further related advantages.

SUMMARY OF THE INVENTION

The present invention provides Diels-Alder (DA) crosslinkable dendritic nonlinear optical (NLO) chromophore compounds, films and crosslinked polymer composites formed from the DA crosslinkable dendritic chromophores, methods for making and using the DA crosslinkable dendritic chromophores, films, and crosslinked polymer composites, and electro-optic devices that include films and crosslinked polymer composites formed from the DA crosslinkable dendritic chromophores.

In one aspect, the invention provides DA crosslinkable dendritic chromophore compounds. In one embodiment, the invention provides a compound having the formula (I):

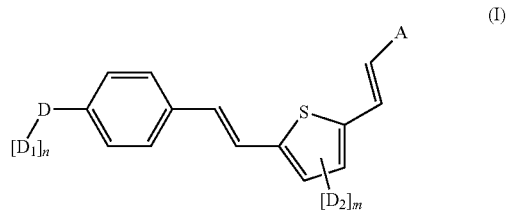

wherein D is a π-electron donor group; A is a π-electron acceptor group; $D_1$ is a dendron moiety functionalized with one or more crosslinkable groups; $D_2$ is a dendron moiety functionalized with one or more crosslinkable groups; n is 0, 1, or 2; m is 0, 1, or 2; and m+n is ≥1; wherein the crosslinkable groups are independently selected from the group consisting of an anthracenyl group and an acrylate group.

In one embodiment, the crosslinkable groups are anthracenyl groups.

In one embodiment, the crosslinkable groups are acrylate groups.

In one embodiment, the crosslinkable groups are anthracenyl and acrylate groups.

In one embodiment, $D_1$ and $D_2$ are independently selected from the group consisting of

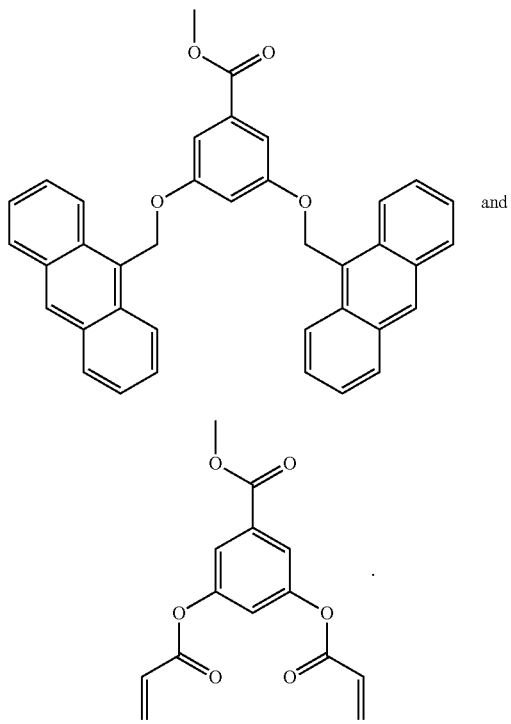

In one embodiment, $D_1$ is d1 and $D_2$ is d1.
In one embodiment, $D_1$ is d2 and $D_2$ is d2.
In one embodiment, $D_1$ is d1 and $D_2$ is d2.
In one embodiment, $D_1$ is d2 and $D_2$ is d1.

In another aspect, the invention provides methods for forming a film or composite having electro-optic activity.

In one embodiment, the method comprises:

(a) depositing first and second compounds of the invention onto a substrate to provide a film, wherein the first compound has one or more anthracenyl groups, and wherein the second compound has one or more acrylate groups;

(b) applying an aligning force to the film at a temperature sufficient to provide a film having at least a portion of the compounds aligned;

(c) heating the film having at least a portion of the compounds aligned at a temperature sufficient to effect crosslinking between the first and second compounds; and (d) reducing the temperature of the film to provide a hardened film having electro-optic activity.

In one embodiment, the method further comprises depositing a crosslinkable crosslinking agent on the substrate.

In one embodiment, the method further comprises depositing a crosslinkable polymer on the substrate.

In another embodiment, the invention provides a method for forming a film having electro-optic activity, comprising:

(a) depositing a crosslinkable compound of the invention onto a substrate to provide a film, wherein the compound has one or more anthracenyl groups and one or more acrylate groups;

(b) applying an aligning force to the film at a temperature sufficient to provide a film having at least a portion of the compounds aligned;

(c) heating the film having at least a portion of the compounds aligned at a temperature sufficient to effect crosslinking; and (d) reducing the temperature of the film to provide a hardened film having electro-optic activity.

In one embodiment, the method further comprises depositing a crosslinkable crosslinking agent on the substrate.

In one embodiment, the method further comprises depositing a crosslinkable polymer on the substrate.

In another aspect, the invention provides films or composites formed by the above methods.

In a further aspect, the invention provides electro-optic that include the films or composites of the invention.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE INVENTION

Figure 1:
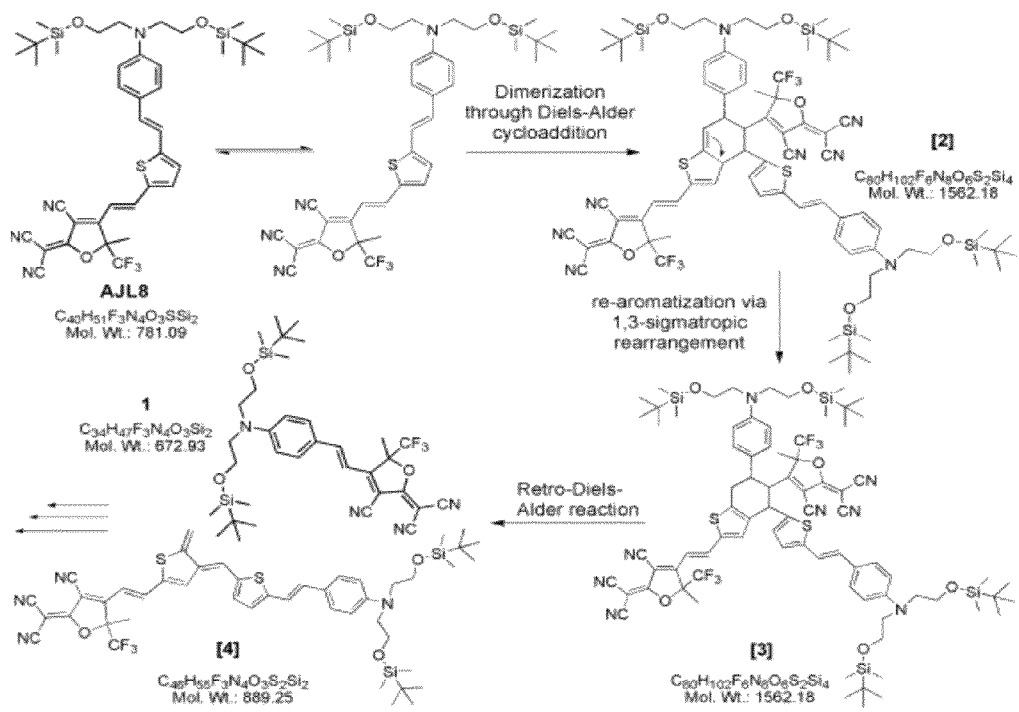
FIG. 1 is a schematic illustration of a tandem Diels-Alder and retro-Diels-Alder decomposition pathway for a thiophene-bridged nonlinear optical chromophore (AJL8)
Figure 2:
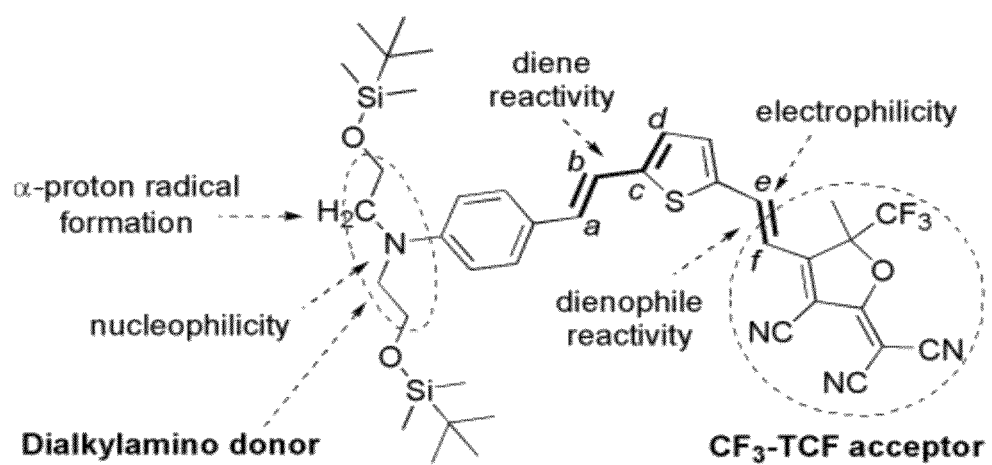
FIG. 2 is an analysis of the chemical instability of a thiophene-bridged nonlinear optical chromophore (ALJ8)

The present invention provides Diels-Alder (DA) crosslinkable dendritic nonlinear optical (NLO) chromophore compounds, films and crosslinked polymer composites formed from the DA crosslinkable dendritic chromophores, methods for making and using the DA crosslinkable dendritic chromophores, films, and crosslinked polymer composites, and electro-optic devices that include films and crosslinked polymer composites formed from the DA crosslinkable dendritic chromophores.

In one aspect, the invention provides DA crosslinkable dendritic chromophore compounds. The chromophore compounds of the invention are crosslinkable by virtue of crosslinkable moieties that functionalize the compounds. The chromophore compounds include crosslinkable moieties that are reactive toward Diels-Alder (4+2) cycloaddition. The chromophore compounds crosslinkable moieties include diene moieties and dienophile moieties. Individual crosslinkable chromophore compounds of the invention can include both diene moieties and dienophile moieties. The chromophore compounds' diene and dienophile moieties are reactive toward other compounds (e.g., DA crosslinkable chromophore compounds, DA crosslinkable polymers, and DA crosslinking agents) having appropriate DA reactivity (i.e., a DA crosslinkable chromophore compound having one or more diene moieties is DA reactive toward a compound having one or more dienophile moieties; a DA crosslinkable chromophore compound having one or more dienophile moieties is DA reactive toward a compound having one or more diene moieties; and a DA crosslinkable chromophore compound having one or more diene moieties and one or more dienophile moieties is DA reactive toward like compounds as well as a compound having one or more diene moieties or a compound having one or more dienophile moieties). As used herein, the terms "chromophore compounds(s)" and "chromophore(s)" are used interchangeably.

The DA crosslinkable chromophore compounds of the invention are dendritic compounds. As used herein, the term "dendritic compound" refers to a compounds that includes one or more dendrons. The dendrons are functionalized with one or more DA crosslinkable moieties (i.e., diene or dienophile). The chromophore compounds of the invention are provided by incorporation of one or more functionalized dendrons. The chromophore compounds of the invention are D-$\pi_1$-B-$\pi_2$-A ("push-pull" chromophores) in which an electron donor group (D) is electronically conjugated to an electron acceptor group (A) through a bridge group (B) optionally via π-bridges $\pi_1$ and $\pi_2$. In one embodiment, the chromophore compound of the invention has a dendron functionalized with a crosslinkable moiety covalently coupled to the compound's donor group (D). In one embodiment, the chromophore compound of the invention has a dendron functionalized with a crosslinkable moiety covalently coupled to the compound's bridge group (B). In one embodiment, the chromophore compound of the invention has a dendron functionalized with a crosslinkable moiety covalently coupled to the compound's donor group (D) and bridge (B) group.

The DA crosslinkable dendritic chromophore compounds of the invention include one or more diene or one or more dienophile moieties. In one embodiment, the diene moieties are anthracene moieties. In one embodiment, the dienophile moieties are acrylate moieties. The compounds of the invention do not include dienophile moieties that are maleimide moieties. Representative dendrons useful for incorporating these crosslinkable moieties into the chromophore compounds of the invention include d1 and d2 shown below.

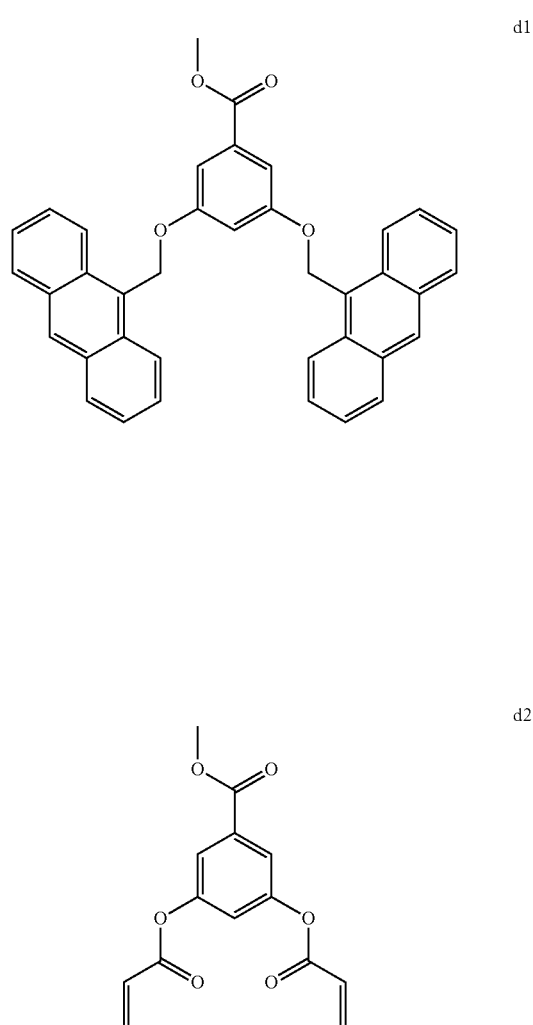

Figure 6:
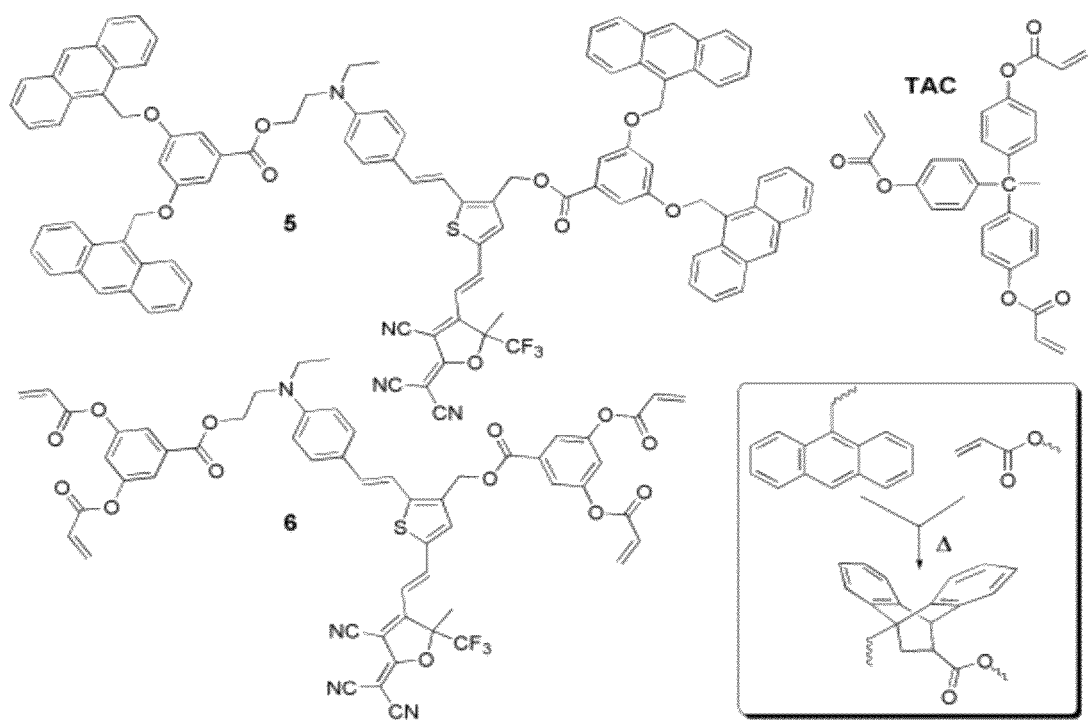
FIG. 6 is a schematic illustration of representative thiophene-bridged nonlinear optical chromophores of the invention (DA crosslinkable dendrimers 5 and 6) and a dienophile crosslinker (TAC) useful for making films of the invention. The DA crosslinked adduct is illustrated in the insert.

Dendron d1 includes two anthracenyl moieties and dendron d2 includes two acrylate moieties. The anthracenyl moiety is reactive toward the acrylate moiety to form a DA (4+2) adduct (or crosslink) as illustrated in FIG. 6. It will be appreciated that dendrons, other than d1 and d2, that include one or more anthracenyl and one or more acrylate moieties, respectively, can be prepared and advantageous utilized in the preparation of the DA crosslinkable dendritic chromophore compounds of the invention.

In one embodiment, the DA crosslinkable dendritic chromophore compound of the invention is a thiophene-bridged chromophore compound having the formula (I)

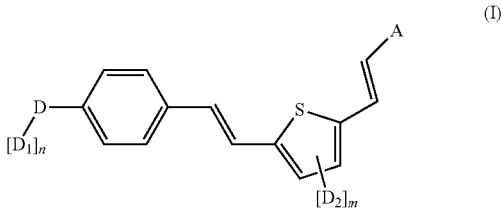

(I)

wherein D is a π-electron donor group, A is a π-electron acceptor group, $D_1$ is a dendron moiety functionalized with one or more crosslinkable groups, $D_2$ is a dendron moiety functionalized with one or more crosslinkable groups, n is 0, 1, or 2, m is 0, 1, or 2, and m+n is ≥1, wherein the crosslinkable group is independently selected from the group consisting of an anthracenyl group and an acrylate group.

In one embodiment, $D_1$ and $D_2$ are the same and the crosslinkable group is an anthracenyl group.

In one embodiment, $D_1$ and $D_2$ are the same and the crosslinkable group is an acrylate group.

In one embodiment, $D_1$ and $D_2$ are different and the $D_1$ crosslinkable group is an anthracenyl group and the $D_2$ crosslinkable group is an acrylate group.

In one embodiment, $D_1$ and $D_2$ are different and the $D_1$ crosslinkable group is an acrylate group and the $D_2$ crosslinkable group is an anthracenyl group.

In one embodiment, $D_1$ is d1, $D_2$ is d1, n is 1, and m is 1.
In one embodiment, $D_1$ is d1, $D_2$ is d1, n is 1, and m is 0.
In one embodiment, $D_1$ is d1, $D_2$ is d1, n is 0, and m is 1.
In one embodiment, $D_1$ is d2, $D_2$ is d2, n is 1, and m is 1.
In one embodiment, $D_1$ is d2, $D_2$ is d2, n is 1, and m is 0.
In one embodiment, $D_1$ is d2, $D_2$ is d2, n is 0, and m is 1.
In one embodiment, $D_1$ is d1, $D_2$ is d2, n is 1, and m is 1.
In one embodiment, $D_1$ is d1, $D_2$ is d2, n is 1, and m is 0.
In one embodiment, $D_1$ is d1, $D_2$ is d2, n is 0, and m is 1.
In one embodiment, $D_1$ is d2, $D_2$ is d1, n is 1, and m is 1.
In one embodiment, $D_1$ is d2, $D_2$ is d1, n is 1, and m is 0.
In one embodiment, $D_1$ is d2, $D_2$ is d1, n is 0, and m is 1.

In certain embodiments, the DA crosslinkable compound includes diene moieties. In these embodiments, the compound includes one or more dendrons functionalized with anthracenyl moieties. In one embodiment, the DA crosslinkable compound includes an anthracenyl-containing dendron covalently coupled to the chromophore's donor group. In one embodiment, the DA crosslinkable compound includes an anthracenyl-containing dendron covalently coupled to the chromophore's thiophene group. In one embodiment, the DA crosslinkable compound includes an anthracenyl-containing dendrons covalently coupled to each of the chromophore's donor and thiophene groups.

A representative DA crosslinkable compound of the invention that includes only diene crosslinkable groups is illustrated in FIG. 6 (see anthracenyl-containing compound 5).

In certain embodiments, the DA crosslinkable compound includes dienophile moieties. In these embodiments, the compound includes one or more dendrons functionalized with acrylate moieties. In one embodiment, the DA crosslinkable compound includes an acrylate-containing dendron covalently coupled to the chromophore's donor group. In one embodiment, the DA crosslinkable compound includes an acrylate-containing dendron covalently coupled to the chromophore's thiophene group. In one embodiment, the DA crosslinkable compound includes an acrylate-containing dendrons covalently coupled to each of the chromophore's donor and thiophene groups.

A representative DA crosslinkable compound of the invention that includes only dienophile crosslinkable groups is illustrated in FIG. 6 (see acrylate-containing compound 6).

In certain embodiments, the DA crosslinkable compound includes diene and dienophile moieties. In these embodiments, the compound includes one or more dendrons functionalized with anthracenyl moieties and one or more dendrons functionalized with acrylate moieties. In one embodiment, the DA crosslinkable compound includes an anthracenyl-containing dendron covalently coupled to the chromophore's donor group and an acrylate-containing dendron covalently coupled to the chromophore's thiophene group. In one embodiment, the DA crosslinkable compound includes an anthracenyl-containing dendron covalently coupled to the chromophore's thiophene group and an acrylate-containing dendron covalently coupled to the chromophore's donor group.

Figure 16:
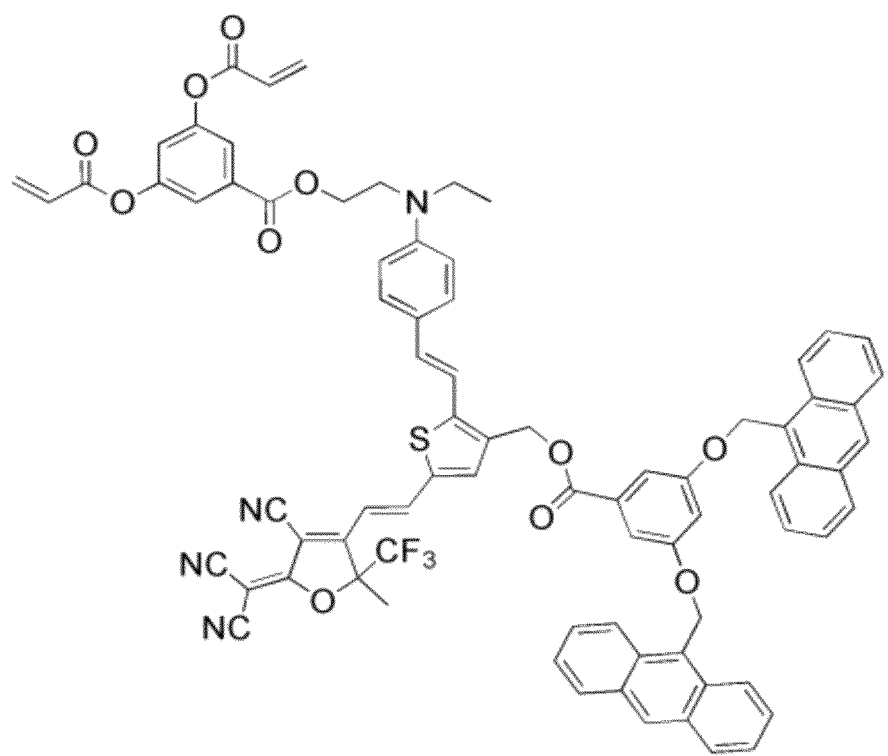
FIG. 16 is a schematic illustration of a representative thiophene-bridged nonlinear optical chromophores of the invention.

A representative DA crosslinkable compound of the invention that includes diene and dienophile crosslinkable groups is illustrated in FIG. 16.

The nature of the dendron and its covalent coupling to the chromophore is not critical. Suitable dendrons are carboxylic acids and are readily covalently coupled to a chromophore through hydroxyl groups (e.g., $-(CH_2)_nOH$) present in the chromophore.

The DA crosslinkable dendritic chromophore compounds of the invention include a π-electron donor group (D) electronically conjugated to a π-electron acceptor group (A) through π-electron bridge group that includes a thiophene group (see formula (I)). As used herein, "π-electron donor group" (represented by D) is an atom or group of atoms with low electron affinity relative to an acceptor (represented by A, defined below) such that, when the donor is conjugated to an acceptor through a π-electron bridge group, electron density is transferred from the donor to the acceptor. A "π-electron acceptor group" (represented by A) is an atom or group of atoms with high electron affinity relative to a donor such that, when the acceptor is conjugated to a donor through a π-electron bridge, electron density is transferred from the acceptor to the donor.

The nature of the donor group (D) and acceptor group (A) in the compounds of the invention (formula (I)) is not critical. Donor and acceptor groups for D-π-A ("push-pull") chromophores are known to those of skill in the art and can be readily incorporated into the compounds of the invention by standard synthetic methodologies.

Representative donor groups include diarylamino (e.g., $-N(C_6H_5)_2$), dialkylamino (e.g., $-N(C_2H_5)_2$), and arylalkylamino groups. The diarylamino, dialkylamino, and arylalkylamino groups can be further substituted to include, for example, crosslinkable groups and/or dendrons. Representative donor groups include dialkylamino groups having the formula:

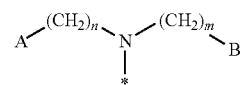

wherein n and m are independently an integer from 1 to 6, and A and B are independently selected from hydrogen, methyl, or OR, where R is hydrogen, C1-C6 alkyl, aryl (e.g., phenyl), acyl (e.g., $-C(=O)-R$, where R is C1-C10), a silyl group (e.g., trimethylsilyl, t-butyldimethylsilyl), a crosslinkable group, or a dendron optionally substituted with a crosslinkable group, and * represents the point of attachment.

Representative acceptor groups include furanylidene groups, such as tricyanofuranylidene groups. Representative acceptor groups include furanylidene groups having the formula:

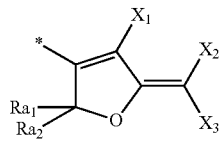

wherein $R_{a1}$ and $R_{a2}$ are independently selected from alkyl (e.g., branched and straight chain C1-C12), fluorinated alkyl, perfluorinated alkyl (e.g., $CF_3$), and substituted alkyl; aryl (e.g., phenyl), fluorinated aryl, perfluorinated aryl (e.g., $C_6F_5$), and substituted aryl; and heteroaryl (e.g., thiophenyl) and substituted heteroaryl; and $X_1$, $X_2$, and $X_3$ are independently selected from electronegative atoms or groups such as fluoro (F), cyano (CN), trifluoromethyl ($CF_3$), and trifluoromethylsulfonyl ($SO_2CF_3$), and * represents the point of attachment.

Representative donor and acceptor groups useful in the compounds of the invention are described in U.S. Pat. Nos. 5,290,630; 5,708,178; 6,067,186; 6,090,332; 7,014,796; 7,029,606; 7,078,542; 7,144,960; 7,268,188; 7,307,173; 7,425,643; 7,507,840; and U.S. patent application Ser. No. 11/952,747, filed Dec. 7, 2007; Ser. No. 11/952,737, filed Dec. 7, 2007; Ser. No. 11/462,339, filed Aug. 3, 2006; Ser. No. 11/462,343, filed Aug. 3, 2006; and Ser. No. 10/212,473, filed Aug. 2, 2002, each incorporated herein by reference in its entirety. Representative donor and acceptor groups useful in the compounds of the invention are illustrated in FIGS. 1, 2, 6, 11, and 13.

Representative DA crosslinkable dendritic chromophore compounds of the invention are illustrated in FIG. 6 (see compounds 5 and 6) and their preparations described in Example 1.

The chromophore compounds of the invention generally have high electro-optic coefficients; large hyperpolarizability; large dipole moments; chemical, thermal, electrochemical, and photochemical stability; low absorption at operating wavelengths (e.g., 1.3 and 1.55 μm); and suitable solubility in solvents used for making the composites.

Nonlinear optical activity of chromophore compounds depends mainly on the compound's hyperpolarizability (β). A measure of a compound's nonlinearity is μβ, where μ is the compound's dipole moment. A compound's optical nonlinearity (μβ) can be measured as described in Dalton et al., "Importance of Intermolecular Interactions in the Nonlinear Optical Properties of Poled Polymers", *Applied Physics Letters*, Vol. 76, No. 11, pp. 1368-1370 (2000).

A compound or composite's electro-optic coefficient ($r_{33}$) can be measured using attenuated total reflection (ATR) technique at telecommunication wavelengths of 1.3 or 1.55 μm. A representative method for measuring the electro-optic coefficient is described in Dalton et al., "Importance of Intermolecular Interactions in the Nonlinear Optical Properties of Poled Polymers", *Applied Physics Letters*, Vol. 76, No. 11, pp. 1368-1370 (2000).

The chromophore compounds of the invention can be advantageously formed into films or composites having EO activity and used in EO devices. Thus, in another aspect, the present invention provides a film (or composite) formed from a DA crosslinkable dendritic chromophore compound of the invention. In one embodiment, the films or composites of the invention are formed by crosslinking a first chromophore compound of the invention having one or more diene groups and a second chromophore compound of the invention having one or more dienophile groups to provide a crosslinked polymer composite. In another embodiment, the films or composites of the invention are formed by crosslinking a crosslinkable chromophore compound of the invention having one or more diene groups and one or more dienophile groups to provide a crosslinked polymer composite. Alternatively, the films or composites of the invention are formed by crosslinking one or more chromophore compounds of the invention with a DA crosslinkable polymer and/or a DA crosslinkable crosslinking agent.

In one embodiment, the films or composites of the invention do not include non-crosslinkable host materials or other non-crosslinkable components (e.g., D-π-A ("push-pull") chromophores). In other embodiments, the films or composites can include non-crosslinkable host materials or other non-crosslinkable components.

Suitable crosslinkable polymers useful in making the films and composites of the invention include polymers having pendant diene groups (e.g., anthracenyl groups) or polymers having pendant dienophile groups (e.g., acrylate groups). Polymers having pendant diene groups are DA reactive with DA crosslinkable chromophore compounds of the invention having dienophile groups (e.g., acrylate groups) to provide crosslinked polymer films or composites. Similarly, polymers having pendant dienophile groups are DA reactive with DA crosslinkable chromophore compounds of the invention having diene groups (e.g., anthracenyl groups) to provide crosslinked polymer films or composites. These crosslinkable polymers are not crosslinkable chromophore compounds.

Figure 12A:
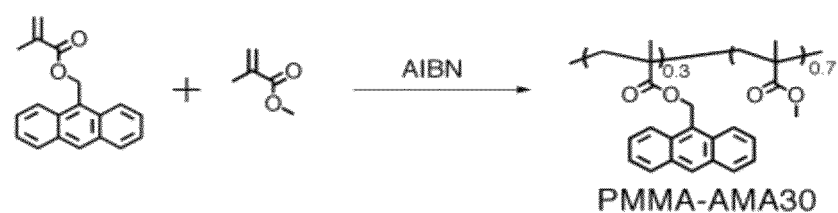
FIGS. 12A and 12B are schematic illustrations of the preparations of representative crosslinkable polymers having pendant anthracenyl groups (PMMA-AMA30) (12A) and (AJL4B) (12B) useful in making films of the invention.
Figure 12B:
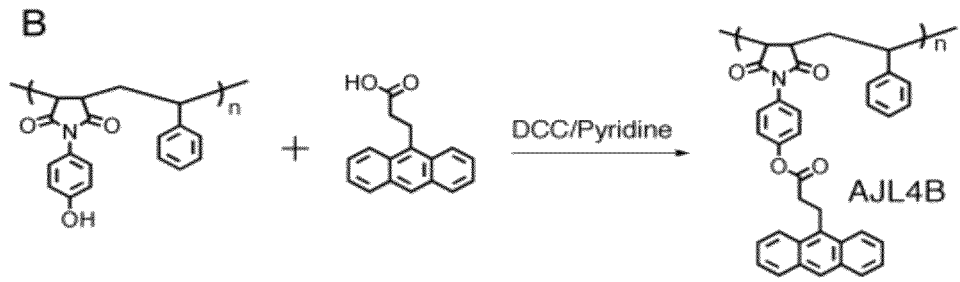

Representative DA crosslinkable polymers useful for making the films or composites of the invention include anthracenyl-containing polymers PMMA-AMA30 and AJL4B illustrated in FIGS. 12A and 12B, respectively.

Suitable crosslinkable crosslinking agents useful in making the films and composites of the invention include compounds having two or more diene groups (e.g., anthracenyl groups) or two or more dienophile groups (e.g., acrylate groups). Crosslinking agents diene groups are DA reactive with DA crosslinkable chromophore compounds of the invention having dienophile groups (e.g., acrylate groups) to provide crosslinked polymer films or composites. Similarly, crosslinking agents having dienophile groups are DA reactive with DA crosslinkable chromophore compounds of the invention having diene groups (e.g., anthracenyl groups) to provide crosslinked polymer films or composites. These crosslinking agents are not crosslinkable chromophore compounds.

A representative DA crosslinkable crosslinking agent is TAC:

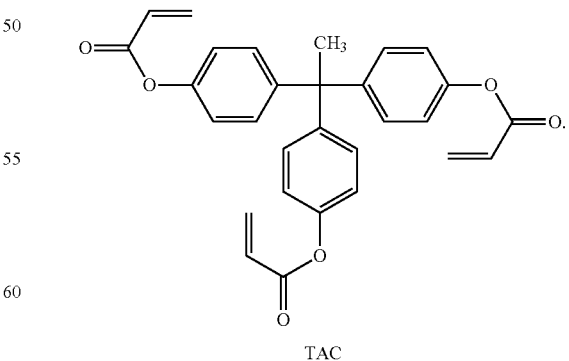

TAC

The product films or composites of the invention have 4+2 cycloaddition adduct crosslinks formed from cycloaddition of anthracenyl and acrylate groups. When only DA crosslinkable chromophore compounds are formed into the film or composite, the product film or composite includes a network (or plurality) of dendritic chromophore compounds covalently coupled through 4+2 cycloaddition adduct crosslinks. When the film or composite is further formed by the inclusion of one or more of a DA crosslinkable crosslinking agent and/or a DA crosslinkable polymer, the product film or composite includes a network (or plurality) of dendritic chromophore compounds, crosslinking agent, and/or polymer covalently coupled through 4+2 cycloaddition adduct crosslinks.

Films can be created by spin coating solutions including the compounds of the invention onto a substrate, optionally with a suitable DA crosslinkable crosslinking agent and/or suitable DA crosslinkable polymer. Compounds of the invention are generally soluble in solvent useful for spin coating including chloroform, cyclopentanone, 1,1,2-trichloroethane, and THF. Pinhole free thin films can be prepared by spin coating directly from 1,1,2-trichloroethane solution. The film surfaces are typically highly uniform as measured by atomic force microscopy (typically about 0.5 nm of root-mean-squared roughness). The amount of chromophore compound in the film (i.e., chromophore density by weight percent) can vary depending on the chromophores used and the EO properties desired. In one embodiment, the film includes about 10 weight percent chromophore. In one embodiment, the film includes about 20 weight percent chromophore. In one embodiment, the film includes about 30 weight percent chromophore. In one embodiment, the film includes about 40 weight percent chromophore. In one embodiment, the film includes about 50 weight percent chromophore. In one embodiment, the film includes include about 60 weight percent chromophore. In one embodiment, the film includes about 70 weight percent chromophore. In one embodiment, the film includes about 80 weight percent chromophore. In one embodiment, the film includes about 90 weight percent chromophore.

In another aspect, the present invention provides a method for forming a film or composite from chromophore compounds of the invention, optionally with a suitable DA crosslinkable crosslinking agent and/or suitable DA crosslinkable polymer, to provide a film or composite in which at least a portion of the chromophores are aligned. The method includes depositing a chromophore compound of the invention, and optionally a suitable DA crosslinkable crosslinking agent and/or suitable DA crosslinkable polymer, onto a substrate; subjecting the deposited materials to a temperature that is equal to or greater than the glass transition temperature of the compound or other materials; applying an aligning force to the deposited materials subjected to elevated temperature to align the chromophore compounds and to effect crosslinking; and reducing the temperature of the composite below the glass transition temperature of the chromophore composite to provide a hardened, at least partially aligned chromophore film.

A representative embodiment of this method includes dissolving the chromophore compound, and optionally suitable DA crosslinkable crosslinking agent and/or suitable DA crosslinkable polymer, in a suitable solvent; spin coating the solvated materials onto a suitable substrate, such as glass, semiconductor, or metal; evaporating any remaining solvent to provide a film (or composite); heating the film (e.g., at or above the glass transition temperature of the film components), applying an electric field (i.e., poling) to align at least a portion of the deposited chromophore compounds and to effect crosslinking; and cooling the composite (e.g., below the glass transition temperature of the composite) to provide the product film. This is only a representative method and many variations are possible in each step. For example, a film components can be deposited from the solid phase by evaporation; the components can be deposited at a temperature above the glass transition temperature of the composite, thus eliminating the heating requirement; or a magnetic or molecular (e.g., self-assembly) force could be used as an aligning force.

In one embodiment, the aligning force comprises an electric field. A representative field is between 0.2 MV/cm and 1.5 MV/cm. Corona poling can also be used as a means for electrostatic poling. Poling techniques are well known to those skilled in the art.

When a chromophore film is at least partially aligned, some of the individual chromophore molecules within the film will be non-centrosymmetrically aligned. The direction of alignment in a representative film will have a relationship to the aligning force. In one representative embodiment, the chromophore molecules will align in the direction of an electric poling field.

In one embodiment, the method for forming the film (or composite) having EO activity includes:

(a) depositing a chromophore compound of the invention and optionally a suitable DA crosslinkable crosslinking agent and/or suitable DA crosslinkable polymer onto a substrate to provide a film;

(b) applying an aligning force to the film at a temperature equal to or greater than the glass transition of the compound and/or optional crosslinking agent or polymer to align at least a portion of the compounds in the film;

(c) heating the film having at least a portion of the compounds aligned at a temperature sufficient to effect crosslinking between compounds or between compounds and optional crosslinking agent or polymer; and (d) reducing the temperature of the film below the glass transition temperature of the compound and/or optional crosslinking agent or polymer to provide a hardened film having at least a portion of the compounds aligned in the film, thereby providing a film having electro-optic activity.

In a further aspect, the present invention provides electro-optic devices formed from a DA crosslinkable chromophore compound of the invention or a film (or composite) described above formed from a chromophore compound of the invention. The chromophore compounds of the invention, their composites, and methods described herein can be useful in a variety of electro-optic applications. As used herein, the term "composite" refers to a crosslinked combination of one or more chromophore compounds of the invention, or a crosslinked combination of one or more compounds of the invention with a suitable DA crosslinkable crosslinking agent and/or a suitable DA crosslinkable polymer. In addition, the chromophore compounds, their composites, and related methods may be applied to polymer transistors or other active or passive electronic devices, as well as OLED (organic light emitting diode) or LCD (liquid crystal display) applications.

The use of organic polymers in integrated optics and optical communication systems containing optical fibers and routers has been previously described. The composites of the invention may be used in place of currently used materials, such as lithium niobate, in most type of integrated optics devices, optical computing applications, and optical communication systems. For instance, the composites of the invention can be used in to fabricate switches, modulators, waveguides, or other electro-optical devices.

For example, in optical communication systems devices fabricated from the composites of the invention can be incorporated into routers for optical communication systems or waveguides for optical communication systems or for optical switching or computing applications. Because the composites of the invention are generally less demanding than currently used materials, devices made from such composites may be more highly integrated, as described in U.S. Pat. No. 6,049,641, which is incorporated herein by reference. Additionally, the composites of the invention can be used in periodically poled applications as well as certain displays, as described in U.S. Pat. No. 5,911,018, which is incorporated herein by reference.

Techniques to prepare components of optical communication systems from optically transmissive materials have been previously described, and can be utilized to prepare such components from the composites provided by the present invention. Many articles and patents describe suitable techniques, and reference other articles and patents that describe suitable techniques, where the following articles and patents are exemplary:

L. Eldada and L. Shacklette, "Advances in Polymer Integrated Optics," *IEEE Journal of Selected Topics in Quantum Electronics*, Vol. 6, No. 1, pp. 54-68 (January/February 2000); E. L. Wooten, et al. "A Review of Lithium Niobate Modulators for Fiber-Optic Communication Systems," *IEEE Journal of Selected Topics in Quantum Electronics*, Vol. 6, No. 1, pp. 69-82 (January/February 2000); F. Heismann, et al. "Lithium niobate integrated optics: Selected contemporary devices and system applications," *Optical Fiber Telecommunications III B*, Kaminow and Koch, eds. New York: Academic, pp. 377-462 (1997); E. Murphy, "Photonic switching," *Optical Fiber Telecommunications III B*, Kaminow and Koch, eds. New York: Academic, pp. 463-501 (1997); E. Murphy, *Integrated Optical Circuits and Components: Design and Applications*, New York: Marcel Dekker (August 1999); L. Dalton et al., "Polymeric Electro-optic Modulators: From Chromophore Design to Integration with Semiconductor Very Large Scale Integration Electronics and Silica Fiber Optics," *Ind. Eng. Chem. Res.*, Vol. 38, pp. 8-33 (1999); L. Dalton et al., "From molecules to opto-chips: organic electro-optic materials," *J. Mater. Chem.*, Vol. 9, pp. 1905-1920 (1999); I. Liakatas et al., "Importance of intermolecular interactions in the nonlinear optical properties of poled polymers," *Applied Physics Letters*, Vol. 76, No. 11, pp. 1368-1370 (13 Mar. 2000); C. Cai et al., "Donor-Acceptor-Substituted Phenylethenyl Bithiophenes: Highly Efficient and Stable Nonlinear Optical Chromophores," *Organic Letters*, Vol. 1, No. 11 pp. 1847-1849 (1999); J. Razna et al., "NLO properties of polymeric Langmuir-Blodgett films of sulfonamide-substituted azobenzenes," *J. of Materials Chemistry*, Vol. 9, pp. 1693-1698 (1999); K. Van den Broeck et al., "Synthesis and nonlinear optical properties of high glass transition polyimides," *Macromol. Chem. Phys.* Vol. 200, pp. 2629-2635 (1999); H. Jiang, and A. K. Kakkar, "Functionalized Siloxane-Linked Polymers for Second-Order Nonlinear Optics," *Macromolecules*, Vol. 31, pp. 2501-2508 (1998); A. K.-Y. Jen, "High-Performance Polyquinolines with Pendent High-Temperature Chromophores for Second-Order Nonlinear Optics," *Chem. Mater.*, Vol. 10, pp. 471-473 (1998); "Nonlinear Optics of Organic Molecules and Polymers," Hari Singh Nalwa and Seizo Miyata (eds.), CRC Press (1997); Cheng Zhang, Ph.D. Dissertation, University of Southern California (1999); Galina Todorova, Ph.D. Dissertation, University of Southern California (2000); U.S. Pat. Nos. 5,272,218; 5,276,745; 5,286,872; 5,288,816; 5,290,485; 5,290,630; 5,290,824; 5,291,574; 5,298,588; 5,310,918; 5,312,565; 5,322,986; 5,326,661; 5,334,333; 5,338,481; 5,352,566; 5,354,511; 5,359,072; 5,360,582; 5,371,173; 5,371,817; 5,374,734; 5,381,507; 5,383,050; 5,384,378; 5,384,883; 5,387,629; 5,395,556; 5,397,508; 5,397,642; 5,399,664; 5,403,936; 5,405,926; 5,406,406; 5,408,009; 5,410,630; 5,414,791; 5,418,871; 5,420,172; 5,443,895; 5,434,699; 5,442,089; 5,443,758; 5,445,854; 5,447,662; 5,460,907; 5,465,310; 5,466,397; 5,467,421; 5,483,005; 5,484,550; 5,484,821; 5,500,156; 5,501,821; 5,507,974; 5,514,799; 5,514,807; 5,517,350; 5,520,968; 5,521,277; 5,526,450; 5,532,320; 5,534,201; 5,534,613; 5,535,048; 5,536,866; 5,547,705; 5,547,763; 5,557,699; 5,561,733; 5,578,251; 5,588,083; 5,594,075; 5,604,038; 5,604,292; 5,605,726; 5,612,387; 5,622,654; 5,633,337; 5,637,717; 5,649,045; 5,663,308; 5,670,090; 5,670,091; 5,670,603; 5,676,884; 5,679,763; 5,688,906; 5,693,744; 5,707,544; 5,714,304; 5,718,845; 5,726,317; 5,729,641; 5,736,592; 5,738,806; 5,741,442; 5,745,613; 5,746,949; 5,759,447; 5,764,820; 5,770,121; 5,76,374; 5,776,375; 5,777,089; 5,783,306; 5,783,649; 5,800,733; 5,804,101; 5,807,974; 5,811,507; 5,830,988; 5,831,259; 5,834,100; 5,834,575; 5,837,783; 5,844,052; 5,847,032; 5,851,424; 5,851,427; 5,856,384; 5,861,976; 5,862,276; 5,872,882; 5,881,083; 5,882,785; 5,883,259; 5,889,131; 5,892,857; 5,901,259; 5,903,330; 5,908,916; 5,930,017; 5,930,412; 5,935,491; 5,937,115; 5,937,341; 5,940,417; 5,943,154; 5,943,464; 5,948,322; 5,948,915; 5,949,943; 5,953,469; 5,959,159; 5,959,756; 5,962,658; 5,963,683; 5,966,233; 5,970,185; 5,970,186; 5,982,958; 5,982,961; 5,985,084; 5,987,202; 5,993,700; 6,001,958; 6,005,058; 6,005,707; 6,013,748; 6,017,470; 6,020,457; 6,022,671; 6,025,453; 6,026,205; 6,033,773; 6,033,774; 6,037,105; 6,041,157; 6,045,888; 6,047,095; 6,048,928; 6,051,722; 6,061,481; 6,061,487; 6,067,186; 6,072,920; 6,081,632; 6,081,634; 6,081,794; 6,086,794; 6,090,322; and 6,091,879.

The foregoing references provide instruction and guidance to fabricate waveguides from materials generally of the types described herein using approaches such as direct photolithography, reactive ion etching, excimer laser ablation, molding, conventional mask photolithography, ablative laser writing, or embossing (e.g., soft embossing). The foregoing references also disclose electron acceptors and electron donors that can be incorporated into the compounds of the invention.

Components of optical communication systems that may be fabricated, in whole or part, with the composites of the invention include, without limitation, straight waveguides, bends, single-mode splitters, couplers (including directional couplers, MMI couplers, star couplers), routers, filters (including wavelength filters), switches, modulators (optical and electro-optical, e.g., birefringent modulator, the Mach-Zender interferometer, and directional and evanescent coupler), arrays (including long, high-density waveguide arrays), optical interconnects, optochips, single-mode DWDM components, and gratings. The composites of the invention described herein may be used with, for example, wafer-level processing, as applied in, for example, vertical cavity surface emitting laser (VCSEL) and CMOS technologies.

In many applications, the composites of the invention described herein may be used in place of lithium niobate, gallium arsenide, and other inorganic materials that currently find use as light-transmissive materials in optical communication systems.

The composites of the invention described herein may be used in telecommunication, data communication, signal processing, information processing, and radar system devices and thus may be used in communication methods relying, at least in part, on the optical transmission of information. Thus, a method according to the present invention may include communicating by transmitting information with light, where the light is transmitted at least in part through a material including a composites of the invention.

The composites of the present invention can be incorporated into various electro-optical devices. Accordingly, in another aspect, the invention provides electro-optic devices including the following:

an electro-optical device comprising a composite of the invention;

a waveguide comprising a composite of the invention;

an optical switch comprising a composite of the invention;

an optical modulator comprising a composite of the invention;

an optical coupler comprising a composite of the invention;

an optical router comprising a composite of the invention;

a communications system comprising a composite of the invention;

a method of data transmission comprising transmitting light through or via a composite of the invention;

a method of telecommunication comprising transmitting light through or via a composite of the invention;

a method of transmitting light comprising directing light through or via a composite of the invention;

a method of routing light through an optical system comprising transmitting light through or via a composite of the invention;

an interferometric optical modulator or switch, comprising: (1) an input waveguide; (2) an output waveguide; (3) a first leg having a first end and a second end, the first leg being coupled to the input waveguide at the first end and to the output waveguide at the second end; and 4) and a second leg having a first end and a second end, the second leg being coupled to the input waveguide at the first end and to the output waveguide at the second end, wherein at least one of the first and second legs includes a composite of the invention;

an optical modulator or switch, comprising: (1) an input; (2) an output; (3) a first waveguide extending between the input and output; and (4) a second waveguide aligned to the first waveguide and positioned for evanescent coupling to the first waveguide; wherein at least one of the first and second legs includes a composite of the invention. The modulator or switch may further including an electrode positioned to produce an electric field across the first or second waveguide;

an optical router comprising a plurality of switches, wherein each switch includes: (1) an input; (2) an output; (3) a first waveguide extending between the input and output; and (4) a second waveguide aligned to the first waveguide and positioned for evanescent coupling to the first waveguide; wherein at least one of the first and second legs includes a composite of the invention. The plurality of switches may optionally be arranged in an array of rows and columns.

The following description further illustrates the chromophore compounds of the invention, films or composites that include the compounds, the EO activity of the compounds, films or composites, and methods for making and using the compounds, films or composites.

AJL8 is a model compound to study the thermal decomposition pathway of dipolar chromophores. AJL8 exhibits a relatively large molecular hyperpolarizability ($\beta$ values around $4,000 \times 10^{-30}$ esu). By doping 25 wt % of AJL8 into an amorphous polycarbonate (APC), the guest-host polymer can be poled at about 150° C., leading to a moderate $r_{33}$ value of about 50 pm/V with good temporal stability at 85° C. Because of the reasonable nonlinearity and stability in AJL8/APC system, this material can be used in conventional E-O devices. However, the thermal stability of AJL8-type chromophores has never been thoroughly studied for temperatures greater than 200° C.

The chemical structure of AJL8 contains a strong dialkylamino donor and $CF_3$-TCF acceptor. Because of its strong charge transfer nature, this type of molecules is susceptible to reactions with nucleophilic/electrophilic moieties and diene/dienophile (see FIG. 1). Previously, it was found that dialkylamino donor tends to decompose under high temperatures due to its nucleophilicity and α-hydrogens adjacent to the nitrogen. Chemical sensitivities of this chromophore could be further spotted along its π-conjugation bridge, such as the reactivity of the electron-rich vinylthiophene-based butadiene from $C_a$ to $C_d$, the electrophilicity of $C_e$, and the reactivity of electron-deficient double bonds at the acceptor end (see FIG. 2). These considerations give rise to the complexity of the chromophore's decomposition pathways at high temperatures.

Figure 3:
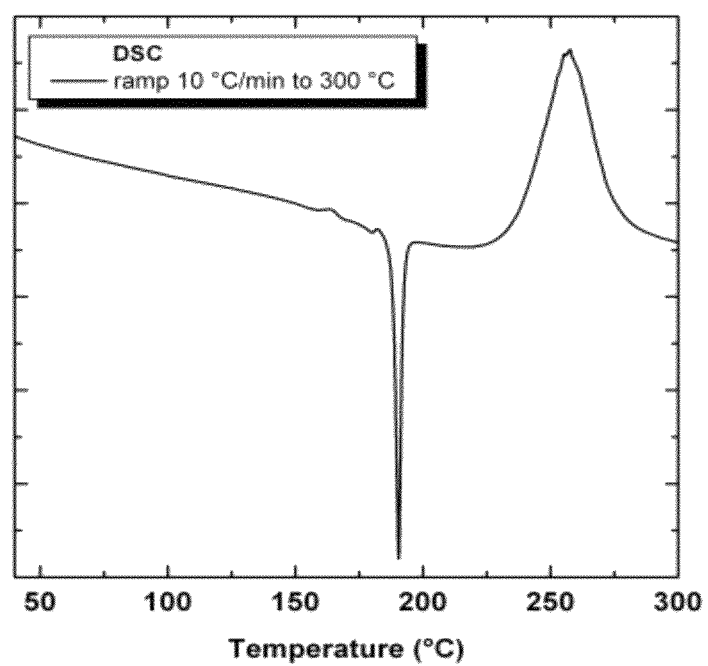
FIG. 3 is a differential scanning calorimetry (DSC) curve for a thiophene-bridged nonlinear optical chromophore (AJL8)
Figure 4:
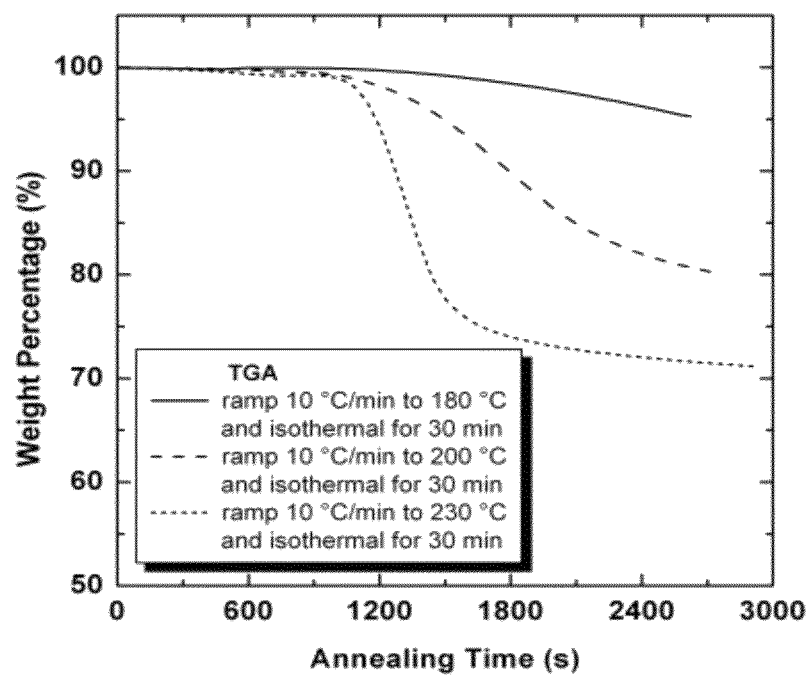
FIG. 4 is a thermogravimetric analysis (TGA) curve for a thiophene-bridged nonlinear optical chromophore (AJL8)

Thermal stability of AJL8 has been studied earlier by differential scanning calorimetry (DSC). At a heating rate of 10° C./min under nitrogen atmosphere, AJL8 was found to start to decompose at temperature above its melting point (192° C.) (see FIG. 3). The thermally induced decomposition can be quantified by programmed thermal gravimetric analysis (TGA). The weight loss of the compound was very minimal (<1 wt %) initially during the first 15-20 min of temperature ramping up, and then started to increase nonlinearly with the time of isothermal annealing (see FIG. 4). The relative rate of weight loss is highly temperature dependent, and the decomposition of compound is much faster under higher annealing temperatures. Surprisingly, even at a temperature of 180° C. which is lower than its melting point, an about 5 wt % weight loss has already been observed after 30-min of isothermal annealing. This level of weight loss indicates non-negligible chromophore decomposition, which has been verified by thin layer chromatography (TLC).

The crystalline AJL8 sample was first isothermally heated at 200° C. for 5 min. After cooling under $N_2$ to room temperature, the residual sample still has good solubility in common organic solvents, allowing the decomposed products to be analyzed by TLC, UV-vis-NIR, $^1$H NMR, and mass spectrometry. Harsher curing conditions, such as higher temperature or longer curing time, often gave insoluble solids, which may be the polymerized byproducts after thermolysis. The testing provide useful information about the critical pathway of AJL8 thermal decomposition.

Figure 5:
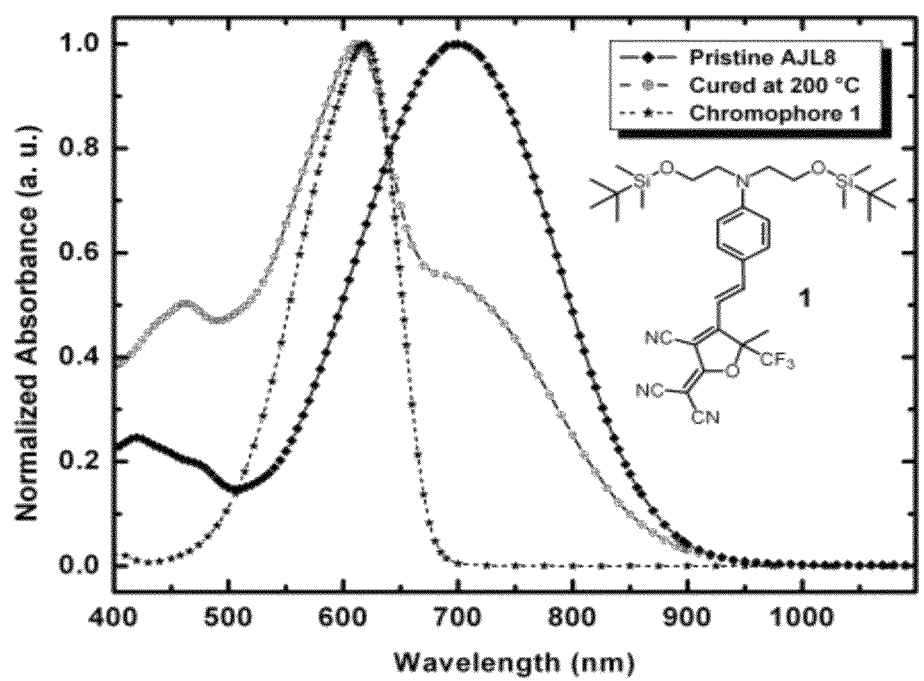
FIG. 5 compares the absorption spectra of pristine AJL8, AJL8 after thermal curing (ramp to 200° C. at the rate of 10° C./min and kept at this temperature for 5 min under nitrogen), and decomposition byproduct chromophore 1 (structure inserted) in THF. The concentration has been normalized to be 0.67 mg/mL.

The absorption spectrum of the cured samples measured in THF is quite different from that of the pristine AJL8. The absorption maximum ($\lambda_{max}$) has blue-shifted for about 80 nm, which is close to that of a much shorter chromophore 1 (see FIG. 5). Indeed, the cured product contains 1 as the major component (about 60%), which was verified by the combined analysis of TLC, $^1$H NMR, and mass spectrometry.

The scheme of tandem DA and retro-DA reactions as the primary decomposition pathway for AJL8 chromophore is schematically illustrated in FIG. 1. Referring to FIG. 1, two AJL8 molecules dimerize to form a DA adduct 2; the metastable compound 2 undergoes 1,3-sigmatropic rearrangement to give compound 3 having a regenerated thiophene ring; and under elevated temperatures, compound 3 is subject to retro-DA reaction to afford the truncated chromophore 1. The decomposition pathway is supported by the following experimental evidence: (1) analysis of the mass spectrum of decomposed products by electrospray ionization showed three distinct peaks with the charge/mass ratio (m/z) values corresponding to species 1 (100), AJL8 (55), 4 (10) or its isomers and 2 or 3 (trace), respectively, (the numbers in the parentheses are the relatively intensities of peaks); (2) large dipole moment chromophores like AJL8 tend to pack anti-parallel, which facilitates intermolecular DA cycloaddition reaction; (3) the s-cis conformer, with respect to $C_b$-$C_c$, can be formed through σ-bond rotation at elevated temperatures to induce some reactivity of AJL8 at the butadiene structure from $C_a$ to $C_d$ (see FIG. 2); (4) compound 1 is unlikely the homolysis product of AJL8, due to the fact that nearly no weight loss has been observed during sample preparation and the thermal activation energy at the curing temperature of 200° C. is far below the bond dissociation energy of the molecule; and (5) more rapid chromophore decomposition is expected once such pathway is initiated and generates unstable species such as 2, 3, and 4 causing avalanche-like chromophore decomposition.

The present invention provides a solution to the thermal instability of certain chromophore compounds by providing chromophores having reinforced site isolation via controlled lattice hardening in E-O dendrimers and polymers. The present invention provides crosslinkable dendritic molecular glasses, in which the anthracene-acrylate-based Diels-Alder (DA) cycloaddition (4+2) is employed as a protocol for high-temperature lattice hardening. The resultant dendrimers possess a high-density of chromophores that, while initially prone to thermal decomposition in their individual soft forms, can be converted into thermally stable networks through DA crosslinking. More importantly, the dynamic phase transition is compatible with the poling process. After poling, these materials have large E-O coefficients (up to 84 pm/V) and are stable up to 200° C. for 30 min of thermal excursion. The dendrimers also showed impressive long-term stability at 150° C. for more than 200 hr. This exceptional result provides an effective route to improve thermal stability of highly efficient chromophores by reinforced site isolation.

The present invention provides anthracene-acrylate-based Diels-Alder lattice hardening for reinforced site-isolation in crosslinkable dendrimers. Site isolation of chromophores provided by NLO dendrimers and dendronized polymers has been adapted to overcome their strong electrostatic interaction to achieve good poling efficiency. DA lattice hardening is by far one of the most adaptable schemes to crosslink these materials to enhance temporal stability. In the present invention, the site isolation effect is enhanced by high temperature DA lattice hardening in order to sustain over 200° C. or beyond heating and to suppress the possible bimolecular reaction pathway of chromophore decomposition.

Representative DA crosslinkable E-O dendrimers of the invention are illustrated in FIG. 6 (see compounds 5 and 6). Compound 5 is functionalized with four anthryl groups at the periphery. Triacrylate monomer (TAC) (see FIG. 6) was used as the dienophile crosslinking agent. TAC has excellent compatibility with compound 5, and a 1:1 binary mixture of 5 and TAC (hereafter 5/TAC, FIG. 7) is highly amorphous. The formulated solution of 5/TAC was spin-coated onto glass and indium-tin-oxide (ITO) substrates to form high optical quality films with micron thickness. The onset temperature ($T_x$) of the anthracene-acrylate-based DA crosslinking reaction is around 120° C., which is close to its glass transition temperature ($T_g$). In comparison, the composite of 5/TMI (TMI, trismaleimide crosslinking agent) tends to form gel in a fairly low temperature range (from ambient temperature to 65° C.) within a few hours due to high reactivity of anthracene-maleimide-based DA cycloaddition. Because TAC is a deactivated dienophile compared to TMI, it reduces the temperature gap between $T_x$ and $T_g$ to facilitate processing. This provides significant advantages for using the 5/TAC system, including more easily controlled poling processes, higher poling efficiency, and longer storage time for unpoled films.

Figure 7:
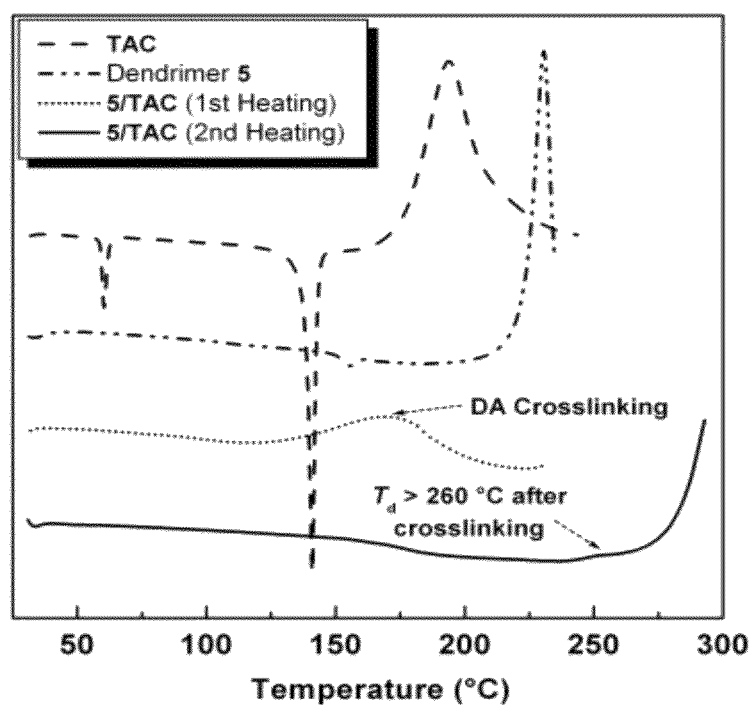
FIG. 7 compares differential scanning calorimetry (DSC) curves for TAC, DA crosslinkable dendrimer 5, and blend 5/TAC before and after curing at 10° C./min under nitrogen.
Figure 8:
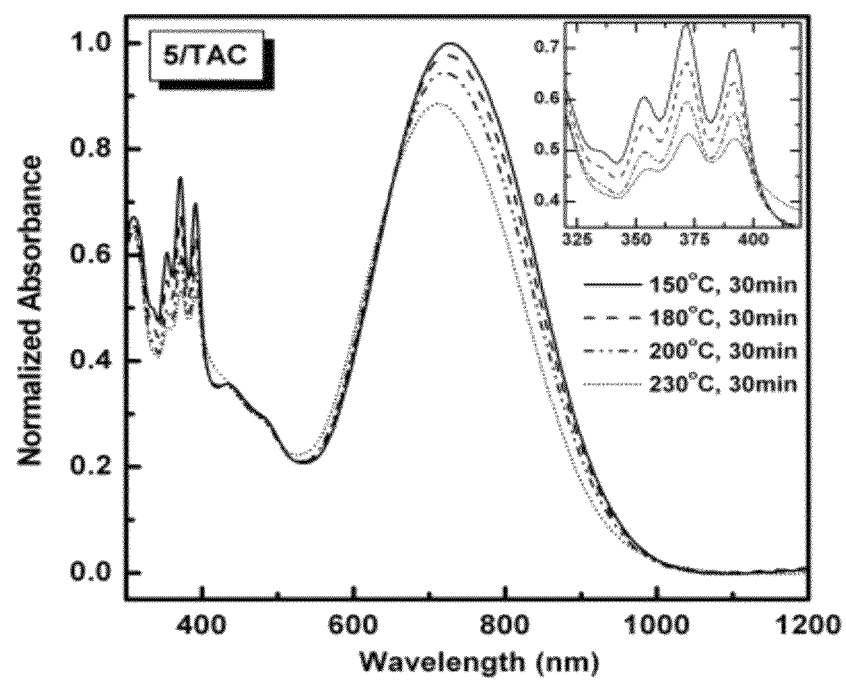
FIG. 8 compares the UV-vis-NIR absorption spectra of thin films of 5/TAC upon thermal curing (150° C. for 30 min, 180° C. for 30 min, 200° C. for 30 min, 230° C. for 30 min. Spectra are normalized to initial absorption peak.
Figure 9:
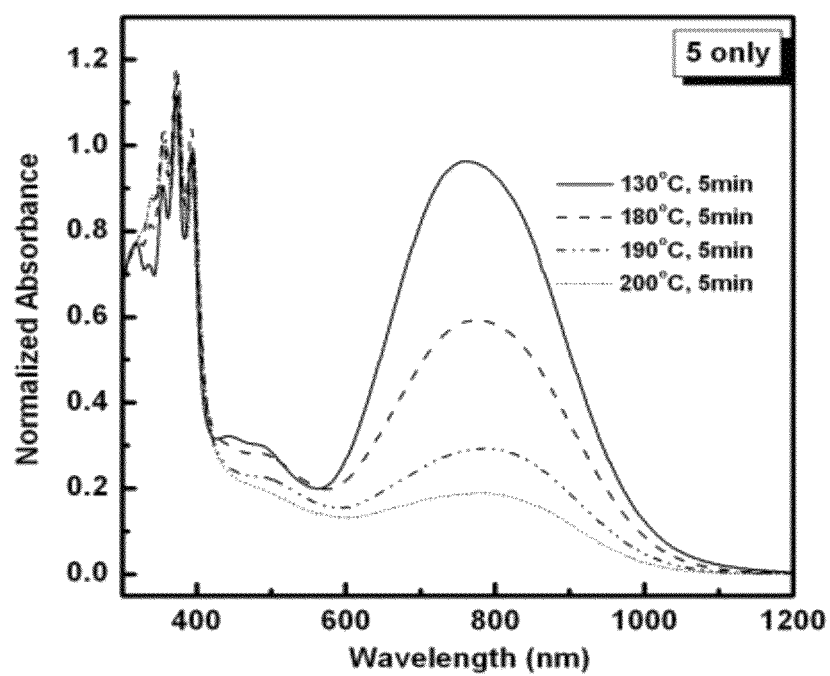
FIG. 9 compares the UV-vis-NIR absorption spectra of thin films of DA crosslinkable dendrimer 5 upon thermal curing (150° C. for 30 min, 180° C. for 30 min, 200° C. for 30 min, 230° C. for 30 min). Spectra are normalized to initial absorption peak.

More importantly, the results from DSC showed that the onset decomposition temperature ($T_{dec}$ in second heating) of 5/TAC is about 60° C. higher than that of compound 5, indicating improved thermal stability of materials after crosslinking (see FIG. 7). Thermal stability of 5/TAC and compound 5 were compared at different temperatures by measuring the absorption spectra of thin films after isothermal heating (to quantitatively follow possible chromophore decomposition). Excellent thermal stability of 5/TAC was observed. The thin films of 5/TAC showed <10% of decrease in absorbance after being cured at 200-230° C. for 30 min (see FIG. 8) as opposed to about 75% of absorbance decrease when only compound 5 was cured at 200° C. for 5 min (see FIG. 9). The curing time for compound 5 has to be reduced to only 5 min at each specified temperature interval in order to detect sensible absorbance change of the chromophore prior to its complete disappearance. All cured films of 5/TAC possessed solvent resistance toward THF, 1,1,2-trichloroethane (TCE), and acetone. Upon curing, the intensity of typical anthryl absorption bands located at 350, 370, and 390 nm also decreased considerably, suggesting efficiency of DA lattice hardening via the anthracene-acrylate protocol of the invention.

Replacing TAC with dendrimer 6 provided an equivalent binary mixture of compounds 5/6, which contains a much higher chromophore loading level (39 wt %) than that of the 5/TAC (23 wt %). DSC showed that the onset decomposition temperature of 6 is ~175° C., which is not surprising due to thermal-induced radical polymerization of the periphery acrylates. However, by the same DSC analysis and isothermal heating shown above, crosslinked 5/6 exhibited increased thermal stability at high temperatures up to 230° C., which was comparable to that of 5/TAC. These results systematically prove that reinforced site isolation via DA lattice hardening dramatically improves the thermal stability of E-O dendrimers that contain high concentrations of AJL8-type chromophores.

To study poling and E-O property of these dendrimers, TCE solutions of 5/TAC and 5/6 (with 9 wt % solid content) were filtered through a 0.2 μm syringe filter, and spin-coated onto ITO-coated glass substrates to afford micron-thick films with good optical quality. The selected ITO substrate has suitable conductivity, low reflectivity, and transparency for poling and E-O measurement of these thin film samples. The films were baked at 60° C. under vacuum overnight, then a thin layer of gold was sputtered onto the films as top electrode for contact poling. The sequential curing and poling process were applied to the samples. Typically, the samples were annealed at temperatures about 100-120° C. to initiate partial crosslinking of the binary mixture 5/TAC or 5/6. Annealing enhances the dielectric strength of materials prior to sequential curing/poling process at elevated temperatures. During annealing, only low voltages of about 10-20 V/μm were applied. Then, the temperature was ramped to 180-200° C. at a rate of 5° C./min, while the significantly improved dielectric properties of films allow much higher voltages of up to 150-170 V/μm to be applied sequentially. Finally, the samples were cooled to room temperature and the poling field was removed. The $r_{33}$ values of poled films were measured by using the modified Teng-Man reflection technique at the wavelength of 1310 nm (C. C. Teng and H. T. Man, *Appl. Phys. Lett.*, 1990, 56, 1734). The results are summarized in Table 1.

TABLE 1

Physical and optical properties of 5, 6, 5/TAC, and 5/6.

| Material Entries | Dye[a] Content (wt %) | $\lambda_{max}$[b] (nm) | $T_g$[c] (° C.) | $T_x$[c] (° C.) | $T_{dec}$[c] (° C.) | Thermal stability[d] (%) | Poling Temp. (° C.) | Poling Field (MV/cm) | $r_{33}$[e] (pm/V) at 1310 nm |
|---|---|---|---|---|---|---|---|---|---|
| 5 | 32.0 | 776 | 155 | — | 212 | <10 | — | — | — |
| 6 | 49.0 | 700 | 85 | — | 175 | <10 | — | — | — |
| 5/TAC | 23.0 | 709 | — | 127 | 268 | 89 | 120-182 | 1.0 | 44 |
| 5/6 | 39.0 | 708 | — | 112 | 270 | 89 | 130-200 | 0.9 | 84 |

[a]Net weight percentage of chromophore within dendrimers.
[b]The wavelengths of the absorption maxima on thin film after curing.
[c]Analytic results of Differential Scanning Calorimeter (DSC) at the heating rate of 10° C./min on thermo-equilibrate samples: $T_g$, glass transition temperatures; $T_x$, onset crosslinking temperatures; $T_{dec}$, onset decomposition temperatures.
[d]Residual percentage of chromophores after thin films were isothermally cured. The chromophore content was quantified by the absorbance of films at $\lambda_{max}$. Temperature/duration of curing: 230° C./30 min for 5/TAC and 5/6; 200° C./5 min for compounds 5 and 6.
[e]Electro-Optic coefficients measured at 1310 nm by simple-reflection technique.

Relatively large $r_{33}$ values of 44 pm/V and 84 pm/V were obtained for 5/TAC and 5/6, respectively, which are almost linearly proportional to their chromophore content. This level of E-O activity is about 10-20% lower than those of the lower $T_g$ crosslinkable dendrimers. According to oriented gas model, the orientational factor of $\mu E/(5k_B T)$ decreases at much higher poling temperatures, where E represents the poling field, $k_B$ the Boltzmann constant, and T the poling temperature. Both poled samples showed outstanding results at high temperatures. For example, after the poled samples of 5/6 were exposed to thermal excursion at either 200° C. for 30 min or 150° C. for 200 hr, about 75% of the initial poling-induced $r_{33}$ values was maintained. This is the first example of organic spin-on materials showing better E-O activity and similar thermal stability compared the benchmark organic EO crystal, DAST.

A representative DA crosslinkable compound of the invention that includes diene and dienophile crosslinkable groups is illustrated in FIG. 16. The physical properties of the DA crosslinkable chromophore as summarized in Table 2.

TABLE 2

Physical properties of a representative DA crosslinkable chromophore.

| Dye content (wt %) | $\lambda_{max}$[b] (nm) | $T_g$[c] (° C.) | $T_x$[c] (° C.) | $T_{dec}$[c] (° C.) | Therm. Stab.[d] (%) |
|---|---|---|---|---|---|
| 39 | 705 | — | 130 | 273 | 90 |

[a]Net weight percentage of chromophore within dendrimers.
[b]Wavelengths of the absorption maxima on thin film after curing.
[c]Analytical DSC results at the heating rate of 10° C./min on thermo-equilibrate samples: $T_g$, glass transition temperatures; $T_x$, onset crosslinking temperatures; $T_{dec}$, onset decomposition temperatures.
[d]After isothermal heating on thin film at 230° C. for 30 min monitored by UV-vis-NIR.

The poled films described above prepared from DA crosslinkable dendrimers demonstrated large EO coefficients (up to 84 pm/V at 1310 nm) and process temporal stability at 200° C. for 30 min. However, the preparation of well-defined dendrimers can be complicated and time consuming. Moreover, because of the poor dielectric strength of the binary dendrimers, an annealing process is needed prior to the sequential curing/poling process at elevated temperatures to apply large electric fields for efficient poling. The difficulty of preparation and poling process adds a significant complication toward practical applications. To overcome these deficiencies, the present invention further provides ultrahigh thermally stable EO polymeric materials (crosslinked polymer composites) with a capacity of easy, low-cost large-scale synthesis. Furthermore, because of the reasonable dielectric strength of crosslinkable host polymers, a large external electric field can be directly applied to the films to orient the dipolar chromophores during the poling. Compared to the DA crosslinkable dendrimers described above, the crosslinkable EO polymers not only show much simplified poling process, but also lead to much higher poling efficiency (30-50% enhancement).

Crosslinkable polymer AJL4B was prepared through the Steglich esterification using 1,3-dicyclohexylcarbodiimde (DCC) as the condensation reagent between appropriate 9-anthracenepropanoic acid and pendant phenolic group of the high-$T_g$ alternating polymers. The FT-IR spectrum of the resultant anthracenyl-functionalized polymer AJL4B clearly shows a lack of phenol absorbance at about 3200 cm$^{-1}$ compared to the original polymer, which indicates the complete termination of phenolic groups. Gel-permeation chromatography (GPC) reveals a number-average molecular weight ($M_n$) of about 25000 for the resultant polymers. Thermal analysis by differential scanning calorimetry (DSC) shows a relatively high glass transition temperature ($T_g$) of 215° C. for AJL4B (ramping rate, 10° C./min, under nitrogen). PMMA-AMA30 (poly[(methyl methacrylate)-co-(9-anthracenyl methyl methacrylate)] with around 30 mol % of the anthracenyl moiety) was obtained from the radical polymerization at the presence of AIBN. The DSC study shows a moderately high $T_g$ of 135° C. The structures of anthracenyl-containing crosslinkable polymers PMMA-AMA30 and AJL4B are illustrated in FIGS. 12A and 12B, respectively.

Figure 13:
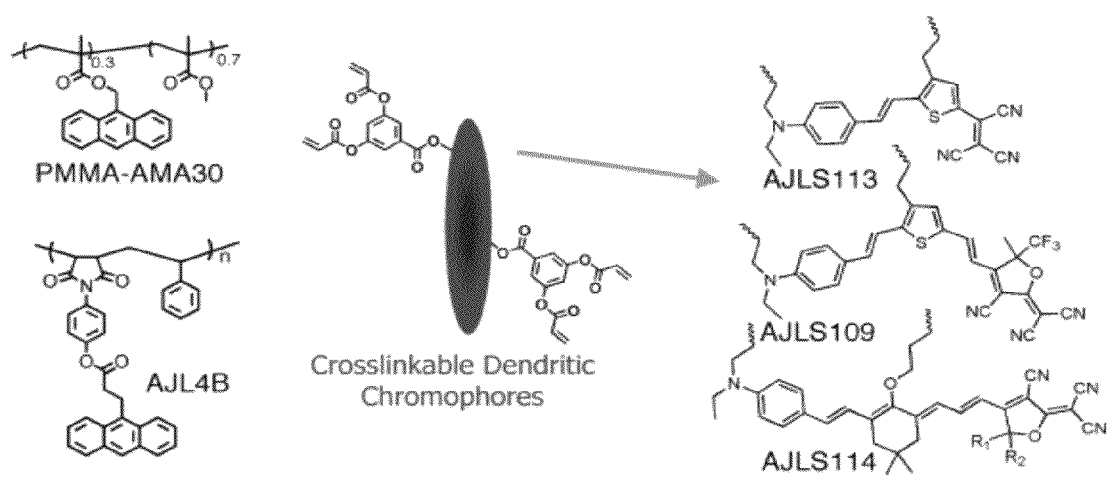
FIG. 13 is a schematic illustration of the preparation of representative polymer composites of the invention from crosslinkable polymers having pendant anthracenyl groups (PMMA-AMA30 and AJL4B) and DA crosslinkable dendrimers having acrylate-functionalized dendrons (AJLS113, AJLS109, and AJLS114).

Representative crosslinked chromophores systems (crosslinked polymer composites) were prepared by reaction of the anthracenyl-containing crosslinkable polymers with DA crosslinkable dendritic chromophores (AJLS109, 113, 114), each having a first-generation dendron capped with acrylate moiety at both donor site and bridge site. FIG. 13 is a schematic illustration of the preparation of the representative crosslinked chromophores systems (crosslinked polymer composites).

Figure 14:
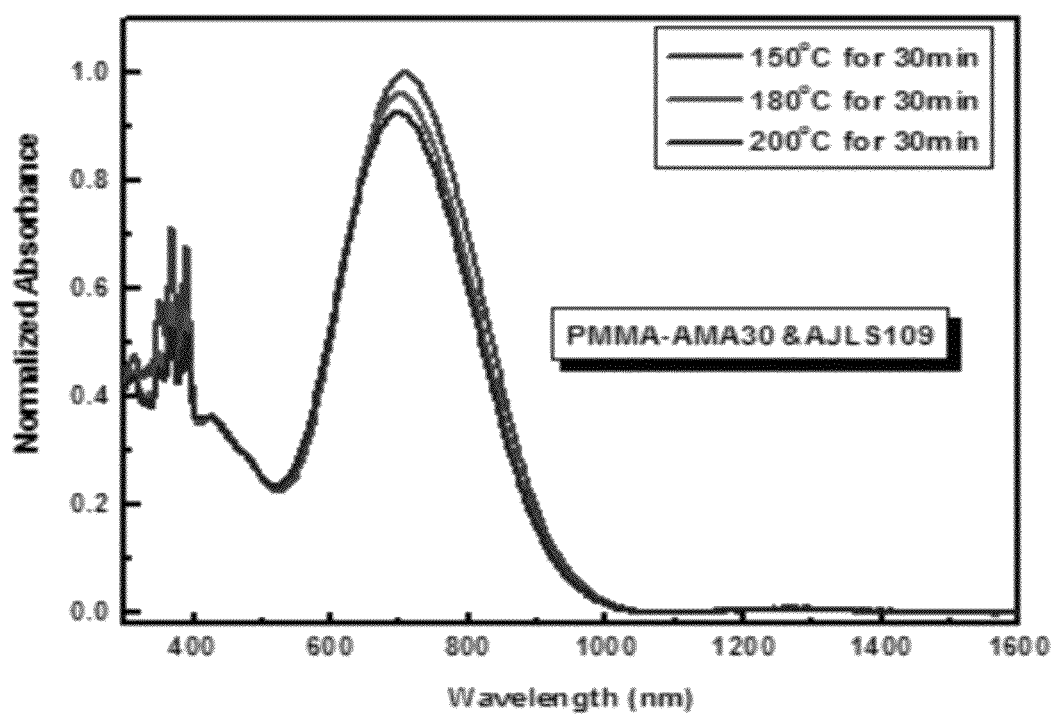
FIG. 14 compares the UV-vis-NIR absorption spectra of thin films of PMMA-AMA30/AJLS109 upon thermal curing (150° C. for 30 min, 180° C. for 30 min, 200° C. for 30 min).
Figure 15:
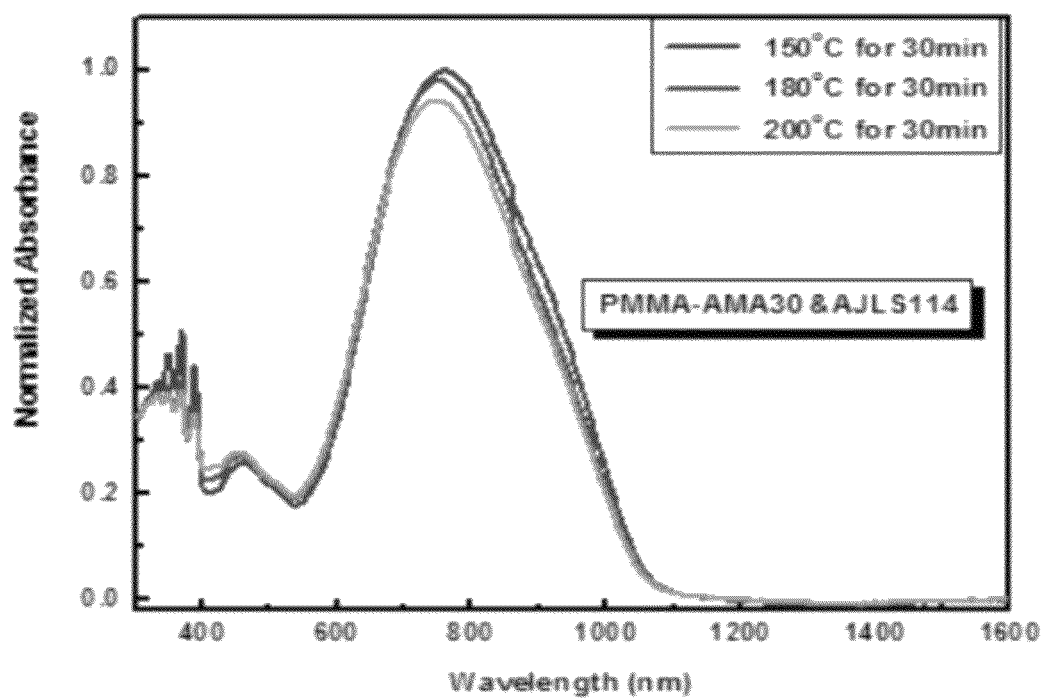
FIG. 15 compares the UV-vis-NIR absorption spectra of thin films of PMMA-AMA30/AJLS114 upon thermal curing (150° C. for 30 min, 180° C. for 30 min, 200° C. for 30 min).

The anthracenyl-containing crosslinkable polymers show good compatibility with the relatively high polar DA crosslinkable dendritic chromophores. To study the chromophoric absorptivity and stability in solid states, DA crosslinkable dendritic chromophore compounds AJLS109, 113, and 114 were mixed into a solution with PMMA-AMA30 or AJL4B in 1,1,2-trichloroethane. By controlling the 1:1 molar ratio of anthracenyl and acrylate moieties in the composite, the net chromophore content of polymer composites containing AJLS109 and AJLS114 was about 16-17 wt %, and that of polymer composites containing AJLS113 was 12 wt %. These solutions were spin-coated onto glass and ITO substrates and baked overnight at 50° C. in vacuum oven to afford thin films, respectively. The films showed good mechanical strength, and were optically smooth and uniform upon visual inspection by optical microscopy. The DSC study showed the onset temperature ($T_x$) of the anthracene-acrylate-based DA crosslinking reaction in the polymer composites is around 120° C., which is in line with that of the DA crosslinkable dendritic chromophores. More importantly, the results from DSC showed the similar performance on prolonging the chromophore stability (onset decomposition temperature ($T_{dec}$ in second heating) of material composites is up to 270° C.) as dendrimer systems, clearly indicative of improved thermal stability of materials after crosslinking. Thermal stability of polymer composites was investigated by measuring the absorption spectra of thin films after isothermal heating at different temperatures, which was to quantitatively follow the possible chromophore decomposition. It should be noted that the intensity of typical anthracenyl absorption bands located in 350, 370, 390 nm decreased considerably, indicating the good efficiency of DA lattice hardening. All thin films composed of PMMA-AMA30 and AJL4B showed <10% of decrease in absorbance after being cured at 200° C. for 30 min (see FIG. 14, crosslinked polymer composite PMMA-AMA30; FIG. 15, crosslinked polymer composite PMMA-AMA30 and PMMA-AMA30 and AJLS114), while the absorbance of DA crosslinkable dendritic chromophores AJLS109, 113, and 114 showed nearly complete disappearance after being cured at 150° C. for 15 min. The decolor phenomena are primarily attributed to the thermal-induced radical polymerization of the peripheral acrylate moieties.

To study poling and E-O properties of the crosslinked polymer composites, 9 wt % solutions of DA crosslinkable dendritic chromophore compounds AJLS109, AJLS113, and AJLS114 and crosslinkable anthracenyl-containing polymers PMMA-AMA30 or AJL4B in 1,1,2-trichloroethane were formulated, filtered through a 0.2-μm PTFE syringe filter, and spin-coated onto ITO substrates. The loading ratio was selected to keep equal equivalent of anthryl and acrylate groups in the material composites. After baking overnight at 60° C. under vacuum to remove the residual solvent completely, a thin layer of gold was sputtered onto the films as the top electrode for contact poling. Both poling fields and currents were monitored to optimize the entire process. It is worth noting that compared to previous dendrimer samples, which need a critical annealing process at temperatures about 100-120° C. prior to the poling process with large external applied electric fields to obtain enhanced dielectric strength, the sequential curing/poling can be performed straightforwardly due to the reasonable dielectric strength from the host polymers. After cooling to room temperature and removing the poling field, $r_{33}$ values of the poled/cured films were measured using the Teng-Man simple reflection technique at the wavelength of 1.31 μm. The poling conditions and measured $r_{33}$ values of these polymers are tabulated in Table 2. Comparable large $r_{33}$ values of 42 pm/V and 86 pm/V were obtained for PMMA-AMA30/AJLS109 and PMMA-AMA30/AJLS114, respectively. Considering the much lower chromophore content relative to that of the DA crosslinkable dendritic chromophores, these crosslinked polymer composites show greater poling efficiency about 30-50%. Furthermore, crosslinked polymer composites based on higher $T_g$ polymer of AJL4B demonstrate relatively lower $r_{33}$ values of 33 pm/V and 68 pm/V for AJL4B/AJLS109 and AJL4B/AJLS114, respectively, which can be ascribed to the decreasing orientational factor with increasing poling temperature in the oriented gas model.

Moreover, the poled samples showed temporal stability at high temperatures. For example, after the poled samples of AJL4B/AJLS109 and AJL4B/AJLS114 were exposed to thermal excursion at 150° C. for 5 hrs, around 85% of the initial poling-induced $r_{33}$ values were still retained in virtue of the site isolation effect via effective DA crosslinking reactions. As for PMMA-AMA30, even though it original $T_g$ is 135° C., after the thermal curing/poling, the samples show high temporal stability of oriented acentric polar order after exposed to thermal excursion at 150° C. for 30 min. This result can be attributed to the lattice hardening from the effective anthracene-acrylate reactions.

The physical and EO properties of representative crosslinked polymer composites is summarized in Table 3.

TABLE 3

Physical and E-O properties of crosslinked polymers composites.

| Host Polymer | NLO Chromophore | Dye Content (wt %)[a] | $\lambda_{max}$ (nm)[b] | $T_g^{[c]}$ (° C.) Host | $T_g^{[c]}$ (° C.) Guest | $T_{dec}^{[c]}$ (° C.) | Thermal stability[d] (%) | Poling Voltage (V/μm)[e] | Poling Temp. (° C.)[e] | $r_{33}^{[f]}$ (pm/V) @ 1.31 μm |
|---|---|---|---|---|---|---|---|---|---|---|
| PMMA-AMA30 | 109 | 16.7 | 704 |  | 85 | 258 | 93 | 100 | 160 | 42 |
|  | 114 | 17.5 | 769 | 135 | 77 | 253 | 95 | 110 | 160 | 86 |
|  | 113 | 11.9 | 653 |  | 68 | 261 | 93 | 100 | 147 | 12 |
| AJL4B | 109 | 16.4 | 707 |  | 85 | 257 | 92 | 100 | 195 | 33 |
|  | 114 | 17.2 | 772 | 215 | 77 | — | 90 | 100 | 185 | 68 |

[a]Net weight percentage of chromophore within dendrimers.
[b]Wavelengths of the absorption maxima.
[c]Analytic results of DSC at the heating rate of 10° C./min on thermo-equilibrate samples: $T_g$, glass transition temperatures; $T_{dec}$, onset decompostition temperatures.
[d]Residual percentage of chromophore after thin films was isothermally cured. The chromophore content was quantified by the absorbance of the film at $\lambda_{max}$. Duration of curing: 30 min.
[e]All the poling studies were performed by applying the full voltages at the beginning, then ramped the temperature from 40° C. to the optimal poling temperatures at the heating rate of 10° C./min.
[f]Electro-optic coefficients measured by simple-reflection technique.

Through rational material design, a series of highly efficient, crosslinked polymer composites have been designed and synthesized based on the anthracene-acrylate-based DA crosslinking reaction. Two representative anthracenyl-containing polymers (PMMA-AMA30 and AJL4B) with different glass transition temperatures demonstrated effective lattice hardening in prolonging the thermal stability and temporal stability of the oriented polar order. The results show the chemistry of lattice hardening is compatible with the poling process in polymer composites based on both distinct polymers, and also enhances the thermal stability of dipolar chromophores and poling-induced acentric order parameter up to 200-230° C. More importantly, these crosslinked polymer composites show a promising potential in device applications in virtue of the easy processability, high reproducibility, and high poling efficiency compared to previous analogues based on DA crosslinkable dendritic chromophores.

The present invention provides DA crosslinkable dendritic chromophores functionalized with anthracenyl and acrylate moieties that can perform Diels-Alder cycloaddition to fulfill the protocol for high-temperature lattice hardening. These chromophores with high density of standardized AJL8-type chromophores that are prone to thermo-decomposition in their thermoplastic form, can be converted into thermally stable networks to provide excellent site isolation of chromophores. After poling, large EO coefficients (up to 84 pm/V at 1310 nm) can be obtained in these dendrimers. These poled dendrimers maintain their alignment stability at 200° C. for 30 min and also possess impressive long-term stability at 150° C. for more than 200 hrs. This is the first example of organic spin-on materials that shows better EO activity and thermal stability than the benchmark organic EO crystal, DAST. The present invention also provides an effective molecular engineering approach to systematically increase thermal stability of highly polarizable dipolar chromophores for high temperature on-chip applications.

The following examples are provided for the purpose of illustrating, not limiting, the invention.

EXAMPLES

General Methods $^1$H and $^{13}$C NMR spectra were recorded on Bruker 300 and 500 spectrometers, respectively, with $CDCl_3$ as solvent and tetramethylsilane (TMS) as an internal standard unless otherwise specified. Absorption spectra were obtained with a Perkin-Elmer Lambda-9 spectrophotometer. ESI-MS spectra were recorded on a Bruker Daltonics Esquire ion trap mass spectrometer. Glass transition temperatures ($T_g$) were measured by differential scanning calorimetry (DSC) using a DSC2010 in TA instruments with a heating rate of 10° C./min.

Materials.

Dichloromethane ($CH_2Cl_2$), acetone and tetrahydrofuran (THF) were distilled over phosphorus pentoxide and sodium benzophenone ketyl, respectively under nitrogen prior to use. A10 was prepared according to the methods described in the literature. All other chemicals, including A1, A3, A6, A7, and A9, were purchased from Aldrich and were used without further purification. All reactions were carried out under an inert atmosphere unless otherwise specified.

Example 1

Preparation of Representative Dendritic Crosslinkable Chromophore Compounds

Figure 10:
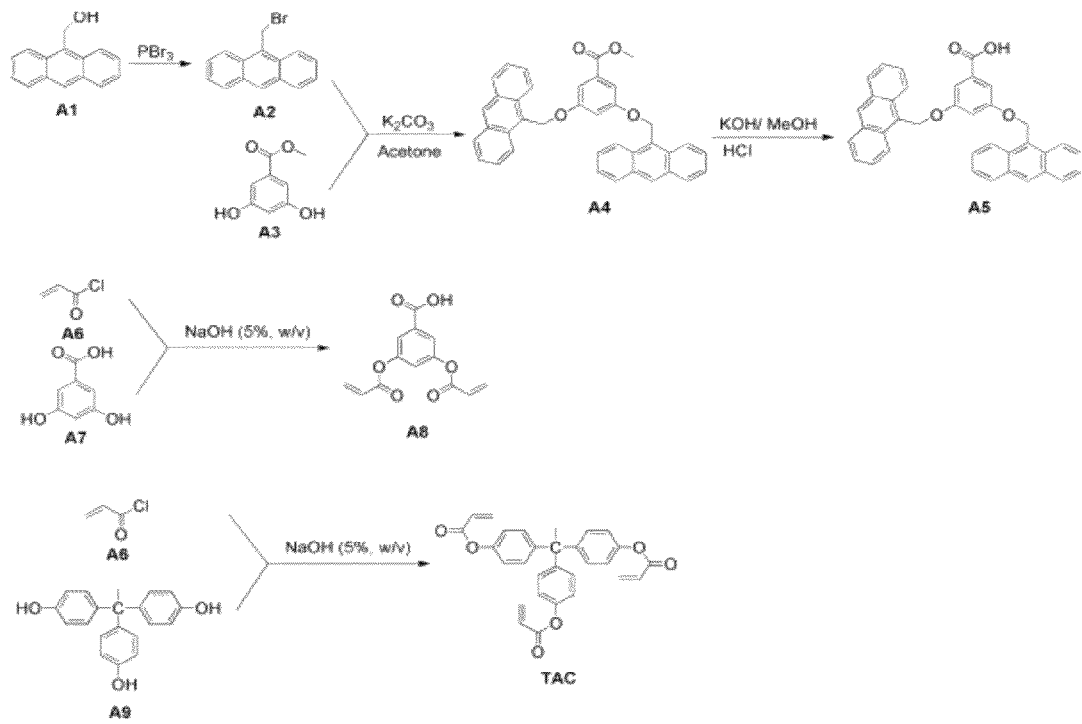
FIG. 10 is a schematic illustration of the preparation of first generation reactive dendrons A5 (anthracenyl) and A8 (acrylate) and dienophile crosslinking agent TAC.
Figure 11:
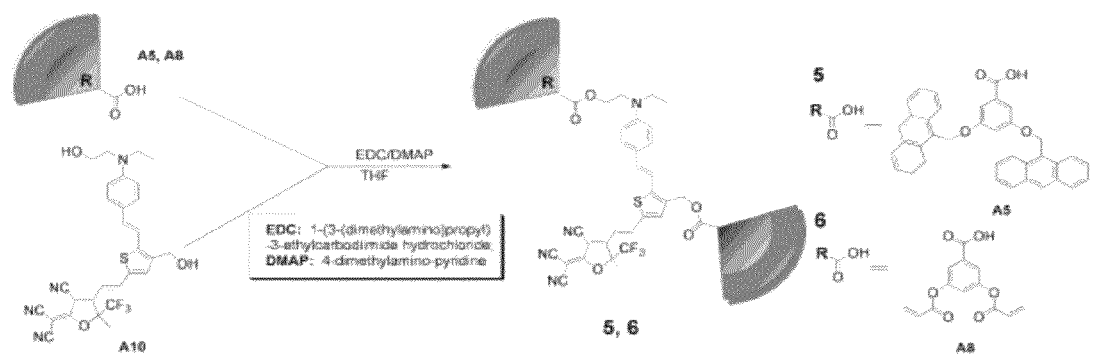
FIG. 11 is a schematic illustration of the preparation of representative DA crosslinkable dendrimers (5 and 6) of the invention.

In this example, the preparation of representative dendritic crosslinkable chromophore compounds of the invention is described. The preparation of dendrons useful in the preparation of the dendritic compounds is illustrated schematically in FIG. 10. The preparation of the representative dendritic compounds is illustrated schematically in FIG. 11.

Compound A2.

The suspension of 9-methanolanthracene (compound A1, 6 g, 29 mmol) in toluene was cooled to 0° C. followed by addition of phosphorus tribromide (3.2 mL, 33.6 mmol) by syringe carefully under nitrogen. The mixture was kept stirring at 0° C. for 1 h and then warmed up slowly to RT. After 3 h, the reaction was quenched by saturated $Na_2CO_3$ solution carefully. After washed by water and brine, the organic layer was dried by $Na_2SO_4$. After removing the solvent under reduced pressure, yellow crystal (compound A2) was obtained (7.5 g, 97%), which was used without further purification. $^1$H NMR (400 MHz, $CDCl_3$): δ 856 (s, 1H), 8.36 (d, J=8.8 Hz, 2H), 8.08 (d, J=8.4 Hz, 2H), 7.67-7.48 (m, 4H), 5.54 (s, 2H).

Compound A4.

To a solution of methyl 3,5-dihydroxylbenzoate (compound A3, 1.54 g, 9.16 mmol), 9-bromomethylanthracene (compound A2, 6.0 g, 22 mmol, 2.4 equiv) in freshly distilled acetone (40 mL) was added potassium carbonate (3.04 g, 22 mmol, 2.4 equiv) slowly and then the reaction mixture was heated to reflux and kept stirring overnight (After 1 h, the reaction mixture turned transparent yellow). After the major part of solvent was removed, the reaction solution was cooled down to 0° C. for crystallization. The yellow needle-like solid was collected and dried in vacuum to afford pure compound A4 as a yellow solid (4.03 g, 81%), mp 250-251° C. $^1$H NMR ($CDCl_3$, TMS, δ ppm): 8.56 (s, 2H), 8.31 (d, J=9.0 Hz, 4H), 8.09 (d, J=7.8 Hz, 4H), 7.61 (s, 2H), 7.58~7.49 (m, 8H), 7.10 (s, 1H), 6.02 (s, 4H), 3.97 (s, 3H).

Compound A5.

The solution of compound A4 (2.36 g, 4.32 mmol), potassium carbonate (1.80 g, 13 mmol) and $MeOH/H_2O$ (30 mL+10 mL) was kept stirring at room temperature overnight, and then removed MeOH under reduced pressure. The reminder was dissolved with $CH_2Cl_2$, and the organic phrase was washed with HCl (2M), brine and then dried over $Na_2SO_4$. The solvent was concentrated and purified using flash chromatography to afford the pure compound A5 (1.78 g, 3.3 mmol, 77%). $^1$H NMR (DMSO, TMS, δ ppm): 8.71 (s, 2H), 8.39 (d, J=8.7 Hz, 4H), 8.16 (d, J=7.8 Hz, 4H), 7.63-7.53 (m, 8H), 7.36 (s, 3H), 6.07 (s, 4H). $^{13}$C NMR (DMSO, TMS, δ ppm): 167.01, 160.00, 133.01, 130.95, 130.53, 128.94, 128.72, 127.01, 126.70, 1265.29, 124.21, 108.46, 106.35, 62.60.

Compound A8.

47 mL of NaOH solution (5%, w/v) was taken in a 100 mL 2-neck flask and deaerated by bubbling with dry $N_2$ for 30 min. 3,5-dihydroxybenzoic acid (compound A7, 3.08 g, 20 mmol) was added into reaction flask slowly. After 5 min with bubbling, acryloyl chloride (compound A6, 7.2 g, 80 mmol) in 10 mL of $CH_2Cl_2$ was added followed by keeping stirring for another 1 h. The white precipitation (4.9 g, 94%) was collected via filtration. $^1$H NMR ($CDCl_3$, TMS, δ ppm): 7.81 (s, 2H), 7.33 (t, J=2.1 Hz, 1H), 6.69~6.63 (m, 2H), 6.39~6.29 (m, 2H), 6.10~6.06 (m, 2H). $^{13}$C NMR: ($CDCl_3$, TMS, δ ppm): 170.32, 163.85, 150.97, 133.57, 131.43, 127.31, 121.01, 120.87.

Compound TAC.

20 mL of NaOH solution (5%, w/v) was taken in a 100 mL 2-neck flask and deaerated by bubbling with dry $N_2$ for 30 min. 1,1,1-tris(4-hydroxyphenyl)ethane (compound A9, 1 g, 3.3 mmol) was added into reaction flask slowly. After 5 min with bubbling, acryloyl chloride (compound A6, 1.78 g, 19.8 mmol) in 10 mL of $CH_2Cl_2$ was added followed by keeping stirring for another 1 h. The white precipitation (1.3 g, 86%) was collected via filtration. $^1$H NMR ($CDCl_3$, TMS, δ ppm): 7.14 (d, J=11.4 Hz, 6H), 7.08 (d, J=11.7 Hz, 6H), 6.65~6.59

(m, 3H), 6.38~6.29 (m, 3H), 6.04~6.00 (m, 3H). $^{13}$C NMR: (CDCl$_3$, TMS, δ ppm): 164.50, 148.84, 146.14, 132.55, 129.70, 127.98, 120.90, 30.88.

Dendrimer 5.

The solution of compound A10 (0.28 g, 0.50 mmol), compound A5 (1.20 g, 2.24 mmol), and 4-dimethylamino-pyridine (DMAP, 0.02 g, 0.176 mmol) in THF (15 mL) was kept stirring at room temperature overnight after addition of 1-(3-(dimethylamino)propyl)-3-ethylcarbodiimide hydrochloride (EDC, 0.20 g, 1.056 mmol) slowly under the nitrogen atmosphere. The solution was kept stirring for 24 h. After filtration of the resultant urea carefully, all of the solvent was evaporated under reduced pressure. The crude product was purified by column chromatography using ethyl acetate and hexane (1:6, v/v) as the eluent to afford dendrimer 5 as a deep green solid (0.69 g, 85%). $^1$H NMR (CDCl$_3$, TMS, δ ppm): 8.51 (s, 2H), 8.44 (s, 2H), 8.22 (d, J=8.7 Hz, 8H), 8.08-7.98 (overlap, 9H), 7.61-7.45 (overlap, 26H), 7.31 (d, J=9.0 Hz, 2H), 7.08 (d, J=21.6 Hz, 2H), 6.80 (d, J=15.5 Hz, 1H), 6.71 (d, J=8.5 Hz, 2H), 6.65 (d, J=15.5 Hz, 1H), 6.48 (d, J=15.5 Hz, 1H), 5.92 (s, 4H), 5.83 (s, 4H), 5.10 (s, 2H), 4.43 (t, 2H), 3.58 (t, 2H), 3.36 (m, 2H), 1.92 (s, 3H), 0.94 (t, J=6.9 Hz, 3H). $^{13}$C NMR: 175.17, 166.51, 166.07, 162.17, 160.60, 160.53, 154.13, 149.44, 140.92, 140.74, 136.49, 136.39, 135.23, 132.05, 131.94, 131.60, 131.59, 131.15, 131.13, 129.68, 129.41, 129.34, 126.89, 126.87, 126.47, 126.28, 125.29, 125.26, 123.97, 123.91, 123.52, 123.01, 113.01, 112.11, 111.20, 110.98, 110.67, 108.83, 108.58, 107.94, 107.45, 97.31, 63.21, 62.64, 59.26, 58.78, 55.52, 48.09, 44.79, 29.91, 19.39, 12.37, 1.23. ESI-MS (m/z): Calcd: 1598.5. Found: 1599.6.

Dendrimer 6.

The solution of compound A10 (0.7 g, 1.23 mmol), compound A8 (0.74 g, 2.82 mmol), and 4-dimethylamino-pyridine (DMAP, 0.04 g, 0.35 mmol) in THF (25 mL) was kept stirring at room temperature overnight after addition of 1-(3-(dimethylamino)propyl)-3-ethylcarbodiimide hydrochloride (EDC, 0.5 g, 2.65 mmol) slowly under the nitrogen atmosphere. The solution was kept stirring for 12 h at room temperature. After filtration of the resultant urea carefully, all of the solvent was evaporated under reduced pressure. The crude product was purified by column chromatography using ethyl acetate and hexane (1:3, v/v) as the eluent to afford dendrimer 6 as a deep green solid (1.23 g, 76%). $^1$H NMR (CDCl$_3$, TMS, δ ppm): 8.09 (d, J=15.6 Hz, 1H), 7.76 (d, J=2.1 Hz, 2H), 7.71 (d, J=2.1 Hz, 2H), 7.57 (s, 1H), 7.47 (d, J=9.0 Hz, 2H), 7.27 (d, J=3.3 Hz, 2H), 7.20 (d, J=3.3 Hz, 2H), 6.82 (d, J=9.0 Hz, 2H), 6.68 (m, 4H), 6.60 (d, J=15.6 Hz, 1H), 6.37 (m, 4H), 6.09 (m, 4H), 5.43 (s, 2H), 4.452 (t, 2H), 3.77 (t, 2H), 3.54 (m, 2H), 1.95 (s, 3H), 1.28 (t, J=6.9 Hz, 3H). $^{13}$C NMR: 175.12, 164.85, 164.39, 163.88, 163.85, 162.43, 154.93, 151.10, 151.00, 149.13, 146.36, 138.27, 136.41, 135.54, 133.75, 133.64, 131.91, 131.39, 129.60, 129.55, 127.35, 127.28, 123.64, 123.26, 120.99, 120.71, 120.61, 120.43, 120.35, 115.66, 112.19, 111.45, 111.18, 110.96, 110.60, 97.46, 94.11, 93.85, 62.62, 59.20, 58.38, 48.57, 45.45, 19.18, 12.42. ESI-MS (m/z): Calcd: 1054.2. Found: 1054.8.

While illustrative embodiments have been illustrated and described, it will be appreciated that various changes can be made therein without departing from the spirit and scope of the invention.

The invention claimed is:

1. A method for forming a film having electro-optic activity, comprising:
    (a) depositing a crosslinkable compound onto a substrate to provide a film, wherein the crosslinkable compound has the formula:

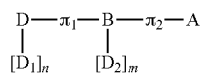

wherein

D is a π-electron donor group,

π$_1$ is an optional π-bridge electronically conjugating D to B,

B is a bridge group,

π$_2$ is an optional π-bridge electronically conjugating B to A,

A is a π-electron acceptor group, wherein D is electronically conjugated to A through B optionally through π-bridges π$_1$ and π$_2$, D$_1$ is a dendron moiety functionalized with one or more crosslinkable groups, D$_2$ is a dendron moiety functionalized with one or more crosslinkable groups, wherein the one or more crosslinkable groups are reactive toward Diels-Alder (4+2) cycloaddition, wherein the crosslinkable groups are independently selected from the group consisting of anthracenyl groups and acrylate groups, n is 0, 1, or 2, m is 0, 1, or 2, and m+n is ≥1;

(b) applying an aligning force to the film at a temperature sufficient to provide a film having at least a portion of the compounds aligned;

(c) heating the film having at least a portion of the compounds aligned at a temperature sufficient to effect compound crosslinking; and (d) reducing the temperature of the film to provide a hardened film having electro-optic activity.

2. The method of claim 1, wherein the crosslinkable groups are anthracenyl groups.

3. The method of claim 1, wherein the crosslinkable groups are acrylate groups.

4. The method of claim 1, wherein the crosslinkable groups are anthracenyl groups and acrylate groups.

5. The method of claim 1, wherein D$_1$ and D$_2$ are independently selected from the group consisting of

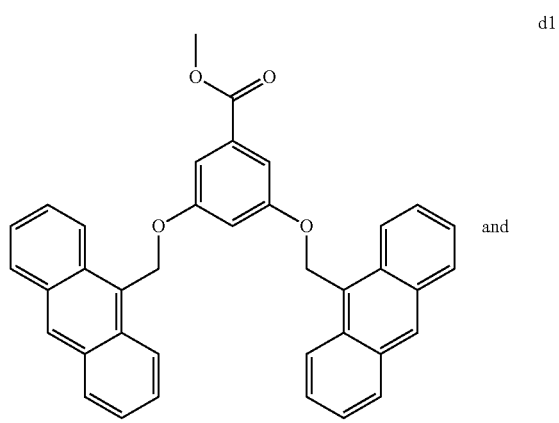

-continued

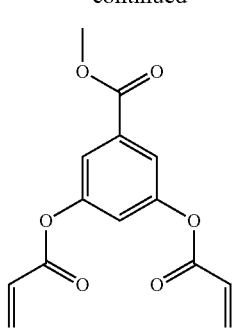
d2

6. The method of claim 5, wherein $D_1$ is d1 and $D_2$ is d1.
7. The method of claim 5, wherein $D_1$ is d2 and $D_2$ is d2.
8. The method of claim 5, wherein $D_1$ is d1 and $D_2$ is d2.
9. The method of claim 5, wherein $D_1$ is d2 and $D_2$ is d1.
10. The method of claim 1 further comprising depositing a crosslinkable crosslinking agent on the substrate.
11. The method of claim 1 further comprising depositing a crosslinkable polymer on the substrate.
12. A film obtainable by the method of claim 1.
13. An electro-optic device, comprising the film of claim 12.
14. A method for forming a film having electro-optic activity, comprising:
 (a) depositing first and second crosslinkable compounds onto a substrate to provide a film, wherein each of the first and second crosslinkable compounds has the formula:

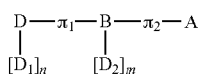

wherein
D is a π-electron donor group,
$\pi_1$ is an optional π-bridge electronically conjugating D to B,
B is a bridge group,
$\pi_2$ is an optional π-bridge electronically conjugating B to A,
A is a π-electron acceptor group,
wherein D is electronically conjugated to A through B optionally through π-bridges $\pi_1$ and $\pi_2$,
$D_1$ is a dendron moiety functionalized with one or more crosslinkable groups,
$D_2$ is a dendron moiety functionalized with one or more crosslinkable groups,
wherein the one or more crosslinkable groups are reactive toward Diels-Alder (4+2) cycloaddition,
wherein the crosslinkable groups are independently selected from the group consisting of anthracenyl groups and acrylate groups,
n is 0, 1, or 2,
m is 0, 1, or 2, and
m+n is ≥1;

(b) applying an aligning force to the film at a temperature sufficient to provide a film having at least a portion of the compounds aligned;
 (c) heating the film having at least a portion of the compounds aligned at a temperature sufficient to effect crosslinking between the first and second compounds; and
 (d) reducing the temperature of the film to provide a hardened film having electro-optic activity.
15. The method of claim 14 further comprising depositing a crosslinkable crosslinking agent on the substrate.
16. The method of claim 14 further comprising depositing a crosslinkable polymer on the substrate.
17. A film obtainable by the method of claim 14.
18. An electro-optic device, comprising the film of claim 17.
19. The method of claim 14, wherein the crosslinkable groups are anthracenyl groups.
20. The method of claim 14, wherein the crosslinkable groups are acrylate groups.
21. The method of claim 14, wherein the crosslinkable groups are anthracenyl groups and acrylate groups.
22. The method of claim 14, wherein $D_1$ and $D_2$ are independently selected from the group consisting of

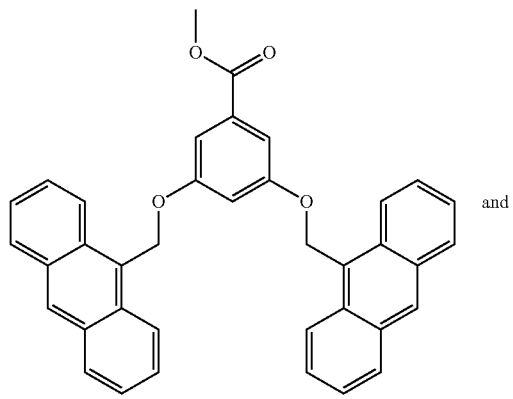
d1 and

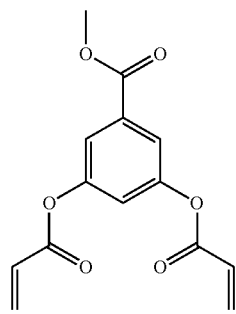
d2

23. The method of claim 22, wherein $D_1$ is d1 and $D_2$ is d1.
24. The method of claim 22, wherein $D_1$ is d2 and $D_2$ is d2.
25. The method of claim 22, wherein $D_1$ is d1 and $D_2$ is d2.
26. The method of claim 22, wherein $D_1$ is d2 and $D_2$ is d1.

* * * * *